United States Patent
Pan et al.

(10) Patent No.: US 11,894,680 B2
(45) Date of Patent: Feb. 6, 2024

(54) INTEGRATED SOLUTION TECHNIQUES FOR SECURITY CONSTRAINED UNIT COMMITMENT PROBLEM

(71) Applicants: Feng Pan, Sugarland, TX (US); Jesse T. Holzer, Kennewick, WA (US); Yonghong Chen, Carmel, IN (US); Arun Veeramany, Richland, WA (US)

(72) Inventors: Feng Pan, Sugarland, TX (US); Jesse T. Holzer, Kennewick, WA (US); Yonghong Chen, Carmel, IN (US); Arun Veeramany, Richland, WA (US)

(73) Assignees: Battelle Memorial Instutute, Richland, WA (US); Midcontinent Independent System Operator, Inc., Carmel, IN (US)

( * ) Notice: Subject to any disclaimer, the term of this patent is extended or adjusted under 35 U.S.C. 154(b) by 1036 days.

(21) Appl. No.: 16/355,574

(22) Filed: Mar. 15, 2019

(65) Prior Publication Data
US 2019/0286993 A1 Sep. 19, 2019

Related U.S. Application Data

(60) Provisional application No. 62/648,659, filed on Mar. 27, 2018, provisional application No. 62/643,843, filed on Mar. 16, 2018.

(51) Int. Cl.
*H02J 3/00* (2006.01)
*G06F 9/54* (2006.01)
(Continued)

(52) U.S. Cl.
CPC .............. *H02J 3/003* (2020.01); *G06F 9/546* (2013.01); *G06N 5/01* (2023.01); *H02J 3/0075* (2020.01);
(Continued)

(58) Field of Classification Search
CPC .. G06N 5/003; G06F 9/546; H02J 3/14; H02J 3/003; H02J 3/0075; H02J 13/00017;
(Continued)

(56) References Cited

U.S. PATENT DOCUMENTS

| 2002/0046231 A1* | 4/2002 | Law | G06F 9/546 |
| | | | 718/107 |
| 2002/0162085 A1* | 10/2002 | Zolotykh | G06F 30/30 |
| | | | 716/104 |

(Continued)

*Primary Examiner* — Tuan C Dao
(74) *Attorney, Agent, or Firm* — Klarquist Sparkman, LLP

(57) ABSTRACT

Apparatus and methods are disclosed for solving Mixed Integer Programming (MIP) problems, such as Security Constrained Unit Commitment (SCUC) problems used by power grid authorities to perform day-ahead market clearing. In certain examples, a plurality of threads of a software tool implementing a concurrent optimizer can be executed concurrently and sequentially to generate new solutions to a SCUC problem for an upcoming planning horizon. Data can be shared among the concurrently executing threads, such as intermediate/incumbent solutions and hints regarding the fixing of variables and constraints to reduce the size of the SCUC problem. In some examples, the threads are seeded with historical solutions from prior planning horizons. The software tool can select a best solution from the solutions generated by the threads, and determine dispatch instructions for a device coupled to the power grid for the upcoming planning horizon based at least in part on the selected solution.

15 Claims, 19 Drawing Sheets

(51) Int. Cl.
  *H02J 13/00* (2006.01)
  *G06N 5/01* (2023.01)
(52) U.S. Cl.
  CPC ..... *H02J 13/00017* (2020.01); *H02J 2203/20* (2020.01)
(58) Field of Classification Search
  CPC ... H02J 2203/20; H02J 2310/64; Y02E 60/00; Y04S 40/124; Y04S 50/10
  See application file for complete search history.

(56) References Cited

U.S. PATENT DOCUMENTS

| | | | | |
|---|---|---|---|---|
| 2004/0215932 | A1* | 10/2004 | Burky | G06F 9/485 712/229 |
| 2005/0144602 | A1* | 6/2005 | Ngai | G06F 8/41 717/151 |
| 2006/0004942 | A1* | 1/2006 | Hetherington | G06F 9/3867 711/3 |
| 2007/0300285 | A1* | 12/2007 | Fee | G06F 21/52 726/1 |
| 2010/0072817 | A1* | 3/2010 | Hirst | H02J 3/24 307/31 |
| 2011/0022434 | A1* | 1/2011 | Sun | G06Q 10/06375 705/7.37 |
| 2012/0311607 | A1* | 12/2012 | Achterberg | G06F 9/526 718/107 |
| 2015/0051938 | A1* | 2/2015 | Li | G06Q 10/06314 705/7.24 |
| 2015/0347149 | A1* | 12/2015 | Galati | G06F 17/11 712/201 |
| 2016/0335568 | A1* | 11/2016 | Bailey | G06Q 10/083 |
| 2017/0083648 | A1* | 3/2017 | Zhang | H02J 3/007 |
| 2019/0138373 | A1* | 5/2019 | Nicol | G06N 3/063 |

* cited by examiner

→ Sequential neighborhood search
- -> Parallel neighborhood search

INTEGRATED SOLUTION TECHNIQUES FOR SECURITY CONSTRAINED UNIT COMMITMENT PROBLEM

CROSS-REFERENCE TO RELATED APPLICATIONS

This application claims priority to and the benefit of U.S. Provisional Patent Application No. 62/643,843, filed Mar. 16, 2018, and U.S. Provisional Patent Application No. 62/648,659, filed Mar. 27, 2018, which applications are incorporated herein by reference in their entireties.

ACKNOWLEDGMENT OF GOVERNMENT SUPPORT

This invention was made with government support under Contract DE-AC05-76RL018830 awarded by the U.S. Department of Energy. The government has certain rights in the invention.

FIELD

This application relates generally to solving Security Constrained Unit Commitment (SCUC) models in the day-ahead market clearing process.

BACKGROUND

Regional Transmission Organizations (RTO) and Independent System Operators (ISO) coordinate, control, and monitor the electrical power system within their region. RTOs and ISOs administer markets for energy generation among entities that compete to provide energy based on factors such as cost and availability of transfer capacity at transmission facilities. Administering this market requires planning of the generation that should be made available in the future based on perceived market demand and transmission constraints. Ideally, the coordination involves optimally selecting the lowest cost options among all offers for generation submitted by market participants that satisfies both energy requirements for the regional electricity market and operating constraints from resources and the transmission grid. Through what is referred to as a day-ahead market clearing process, RTOs and ISOs, such as North America's Midcontinent Independent System Operator (MISO), are solve an optimal set to one of the most challenging SCUC models in a very short time.

Solving a SCUC problem for a given day-ahead electricity market involves balancing the next-day electricity demand and generation for each of a plurality of time periods (e.g., each hour) within a specified upcoming time period (e.g., the next 36 hours), ideally with cost efficiency, reliability, and physical feasibility. Day-ahead market clearing is used to determine the bulk of energy generation for a given day. Real-time dispatch can then make finer adjustments on the day itself. SCUC problems are solved in day-ahead market clearing processes and can be highly complex. For example, in 2017, MISO's footprint covered fifteen states in the United States and one Canadian province with a total generation capacity of 175 gigawatts. The network model included 45,000 buses with 1,401 generation resources in the market and 2,446 commercial pricing nodes. SCUC is typically solved as a linear Mixed Integer Programming (MIP) problem, which is a type of optimization problem involving discrete and continuous variables. In general, MIP problems are NP-hard (e.g., at least as hard as the hardest non-deterministic polynomial acceptable problem), and a polynomial algorithm for solving MIP is not known to exist. The solution time for a MIP problem increases exponentially with the size of the problem. Accordingly, solving a SCUC problem such as MISO's SCUC problem within the market clearing time requirements of three to four hours in the day-ahead market and five minutes in the real-time market creates a unique, unmet challenge. Solving this SCUC problem involves finding the minimum production cost solution among over 135,000 binary variables, 550,000 continuous variables, and 13,000 transmission constraints in a mere twenty-minute timing window.

As more complexity is introduced in the SCUC problems (e.g., an increased number of distributed resources and associated continuous variables), and as stress on transmission grids increases, SCUC models becomes increasingly dense (e.g., as the number of non-zero coefficients in the model increases). As a result, SCUC problems require increasing amounts of time to solve, and off-the-shelf MIP solvers can no longer solve the problems in a timely manner.

Thus, there is ample opportunity to develop advanced optimization solution approaches for solving SCUC and other MIP problems within real-time constraints.

SUMMARY

Disclosed practical applications include improving computer-implemented methods and apparatus for solving Mixed Integer Programming (MIP), linear programming, and other optimization problems. A non-limiting example of a practical application of the disclosed technology for solving MIP problems includes, solving SCUC problems, which due to their nature and complexity, are often treated as Mixed Integer Programming (MIP) problems.

Certain disclosed apparatus and methods can be used for practical applications including solving a SCUC problem associated with a day-ahead market for a power grid, e.g., via a software tool or framework tailored for solving SCUC problems. This tool, which may be referred to as a High Performance Power-Grid Optimization (HIPPO) tool, advantageously incorporates distrusted, scalable algorithms which leverage high-performance computing resources. Testing of the tool has verified that the tool can, in certain implementations, provide quality solutions to current SCUC problems more quickly than any existing known.

For example, in accordance with the present disclosure, a computerized method can include seeding a plurality of computing nodes or processor threads with prior solutions to a MIP problem, and generating new solutions to the MIP problem by concurrently executing the nodes/threads and sharing solution data and/or hints among the nodes/threads. The MIP problem can be a SCUC problem for an upcoming planning horizon of a power grid, and the prior solutions can include previously generated solutions to the SCUC problem for a prior planning horizon of the power grid. The method can further include selecting a solution from among the solutions generated by the nodes/threads for the upcoming planning horizon and determining respective dispatch instructions for one or more generators of the power grid based on the selected solution. The dispatch instructions can then be communicated to the corresponding generators.

The data shared among the nodes/threads can include solutions and hints. For example, intermediate or incumbent solutions to the SCUC problem can be shared among the nodes/threads. Similarly, hints for solving the SCUC problem can be shared among the nodes/threads. The hints can include a hint identifying a binary or continuous variable of the SCUC problem as being a fixed variable, or a hint identifying one of the constraints of the SCUC problem as being de-activated or set as a lazy constraint. In some examples, the data sharing can occur via message sending among the nodes/threads in accordance with a Message Passing Interface.

This Summary is provided to introduce a selection of concepts in a simplified form that are further described below in the Detailed Description. This Summary is not intended to identify key features or essential features of the claimed subject matter, nor is it intended to be used to limit the scope or practical applications of the claimed subject matter. The foregoing and other objects, features, and advantages of the disclosed technology will become more apparent from the following detailed description, which proceeds with reference to the accompanying figures.

DETAILED DESCRIPTION

I. General Considerations

Figure 1:
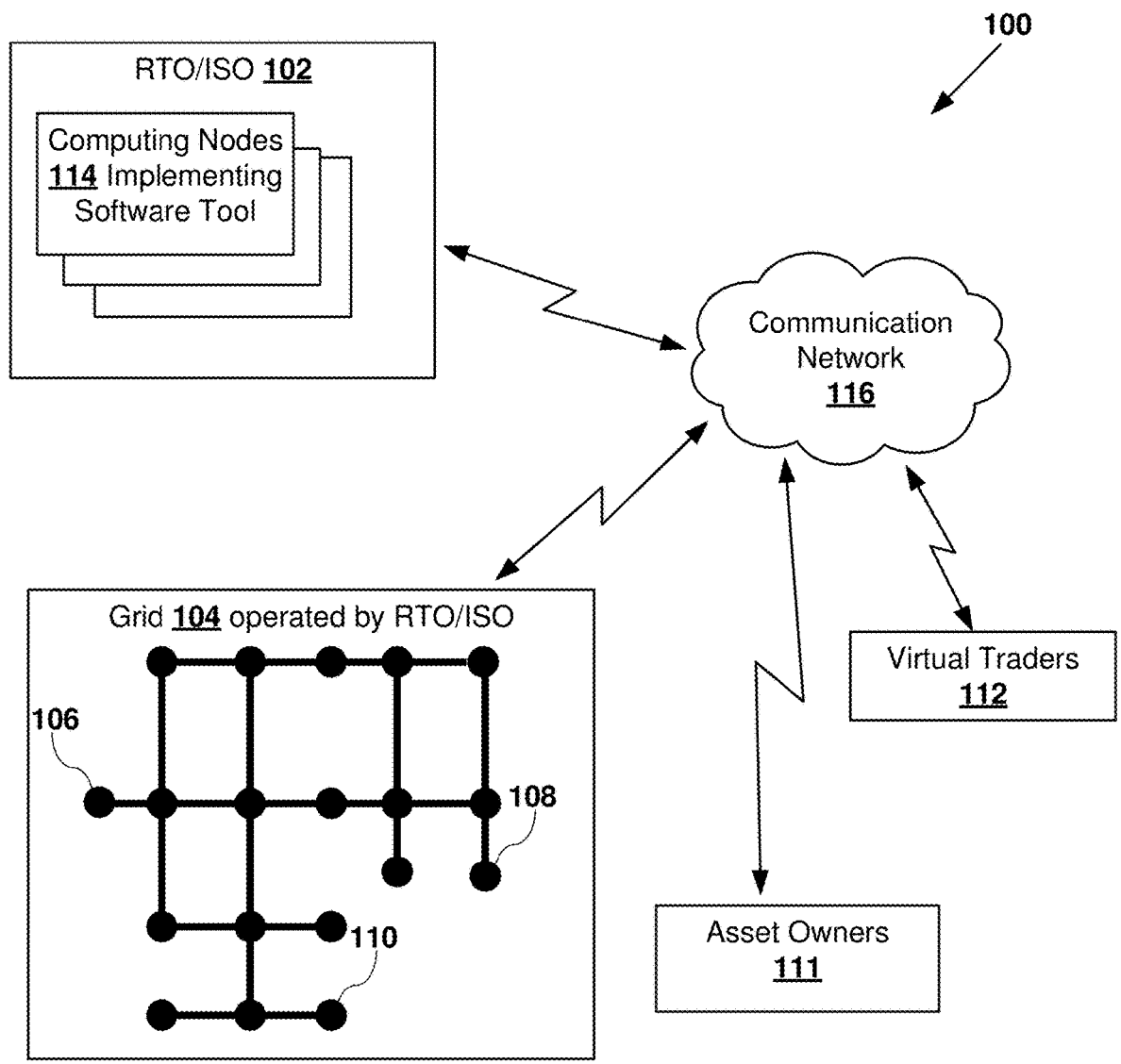
FIG. 1 illustrates an example environment in which certain apparatus and methods, including a software tool for solving MIP problems such as SCUC Problems, can be implemented in accordance with certain examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "seed," "share," "solve," "display," "receive," "evaluate," "determine," "send," "transmit," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers. For example, as described herein, a voltage management planning and assessment tool can be implemented by a software application.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in PHP, ASP.net, HTML, HTML5, Ruby, Perl, Java, Python, C++, C#, JavaScript, Go, or any other suitable programming language. One skilled in the art will appreciate that other languages may be used instead, or in combination with the foregoing and that web and/or mobile application frameworks may also be used, such as, for example, Ruby on Rails, Node.js, Zend, Symfony, Revel, Django, Struts, Spring, Play, Jo, Twitter Bootstrap, and others. It should be further appreciated that the apparatus and methods disclosed herein may be implemented in commercial solving tools, like the CPLEX Optimizer from IBM, the Gurobi Solver distributed by Gurobi Optimization, or software developed specifically for unit commitment from vendors such as GE, Siemens and ABB. Relative to the out-of-the-box algorithms and solving strategies from such solvers and software, the disclosed apparatus and methods can provide additional functionality, faster solving speed, and better solution quality.

Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")) implementing one or more processors. The integrated circuit or specialized computing hardware can be embedded in or directly coupled to an electrical device (or element) that is configured to interact with controllers and coordinators.

II. Overview of SCUC Problems

FIG. 1 depicts a high-level diagram 100 of the context in which a SCUC problem is defined and solved. As shown in FIG. 1, an RTO/ISO 102 can operate and administer a power grid 104 (alternatively referred to herein as a transmission network). Power grid 104 includes a plurality of nodes, the respective nodes representing loads (e.g., load 106), generators (e.g., generator 108), and other devices (e.g., device 110) coupled to the grid. At least some of the loads, generators, and other devices can participate in a market for electricity administered by RTO/ISO 102; these devices may alternatively be referred to as "participants" in a market, and may be associated with corresponding nodes of the grid referred to as "pricing nodes."

The market participants can communicate with RTO/ISO 102 via a communication network 116. For example, in a day-ahead market, participants submit bids and offers to the RTO/ISO. The bids and offers are submitted on pricing nodes. Pricing nodes are mapped to the transmission network. Cleared bids and offers will result in injection and withdrawal of power at the pricing nodes, and thus will impact the power flow on the transmission lines in the network. The participants submitting bids and offers to the RTO/ISO can include asset owners 111 and virtual traders 112. Asset owners 111 can include owners of generators, loads, and other devices coupled to grid 104 (e.g., the owners of load 106, generator 108, and device 110). In contrast, virtual traders 112 can include external parties, and/or computing nodes operated by external parties, that are engaged in conducting "virtual" transactions (e.g., submitting "virtual" bids to the RTO/ISO). The external parties can include members of the finance industry (e.g., day traders). The incorporation of virtual transactions can significantly increase the complexity of a SCUC problem, as these transactions cause additional variables and additional non-zeros on transmission constraints to be added to the SCUC problem.

RTO/ISO 102 includes one or more computing nodes 114 for performing tasks associated with operating and administering the electricity market. Among other tasks, computing nodes 114 are configured to solve SCUC problems in order to clear the electricity market. Towards this end, computing nodes 114 implement the disclosed software tool, which is described further below with reference to FIG. 2.

III. Software Tool for Solving MIP Problems

Figure 2:
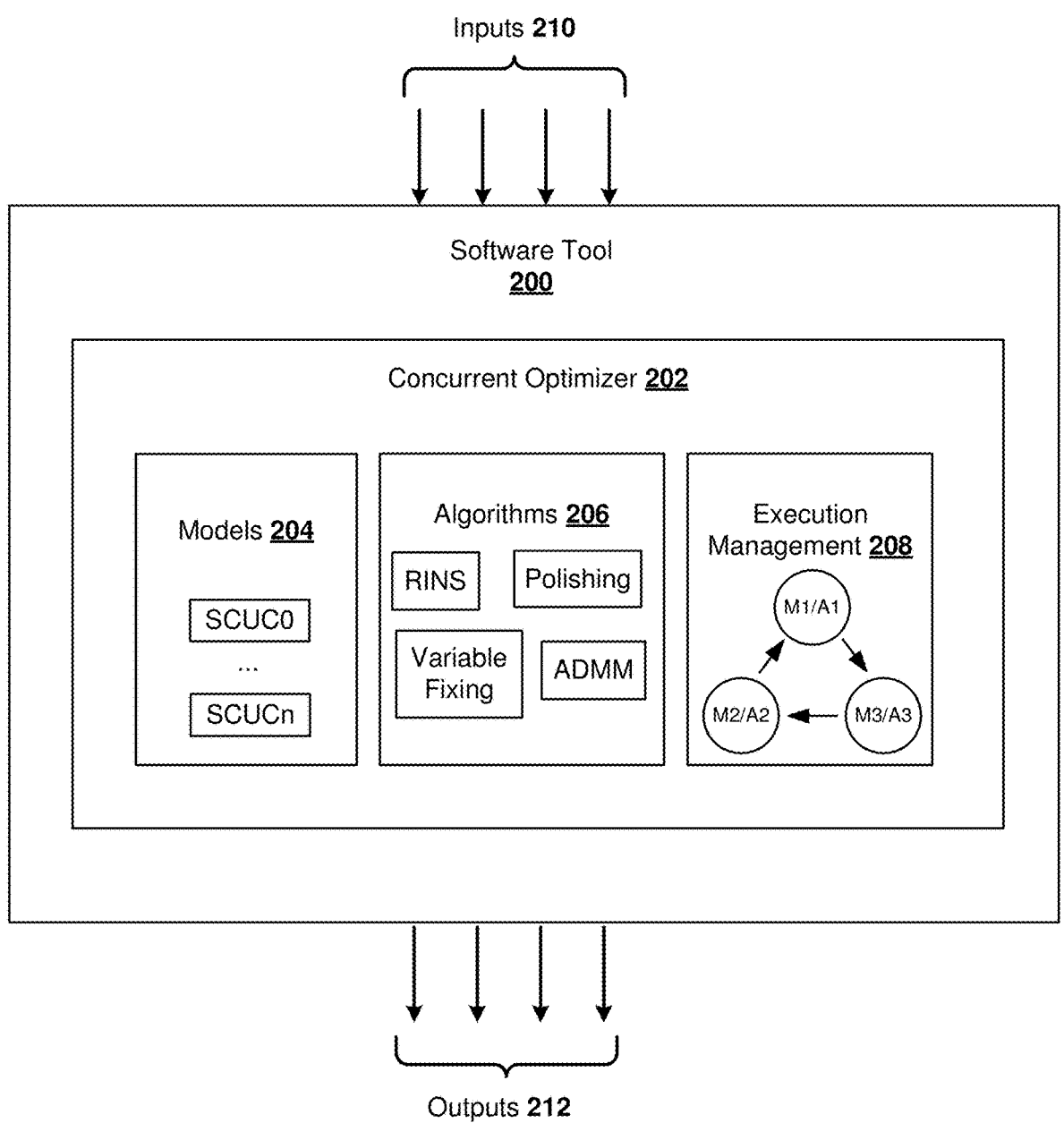
FIG. 2 is a diagram of an exemplary software tool for solving MIP problems such as SCUC problems, as can be implemented in accordance with certain examples of the disclosed technology.

FIG. 2 depicts an example diagram of the disclosed software tool 200. As shown, software tool 200 includes a concurrent optimizer 202, which in turn includes models 204, algorithms 206, and execution management 208. Further, software tool 200 can receive one or more inputs 210, and generate one or more outputs 212. The software tool can encompass one or more executables, the executables including include code written in one or more programming languages (e.g., Python).

Software tool 200 can perform solving operations on any distributed computing hardware, including multiple computers linked together (e.g., clusters or supercomputers), individual computers with multi-threaded, multi-core or multi-processor hardware, etc. For example, software tool 200 can be run via multiprocessing (e.g., via execution of parallel threads on a single computing node), and/or in a distributed manner on multiple computing nodes of a high-performance computer (HPC). Thus, software tool 200 can be implemented via multiple threads, multiple nodes, or via a combination of one or more threads and one or more nodes. As such, it should be understood that any description herein of implementing various aspects of the disclosed software with computing nodes (or just "nodes") can equally apply to doing so with one or more threads, or with a combination of nodes and threads. Similarly, any description herein of implementing various aspects of the disclosed software with threads can equally apply to doing so with one or more nodes, or with a combination of nodes and threads.

As an overview of the functionality performed by software tool 200, concurrent optimizer 202 can execute algorithms 206 via execution management 208. In doing so, the concurrent optimizer can utilize data from models 204, which can include a plurality of SCUC models (e.g., SCUC0, SCUC1, . . . , SCUCn). As used herein, a SCUC model can refer to a model of a particular SCUC problem, and can include values for various parameters of a transmission network associated with the SCUC problem.

Execution management 208 can control individual algorithms executed at different computing nodes, and further can control how each of the lower-level threads within a computing node are executed. In the depicted example of execution management 208, the circles M1/A1, M2/A2, and M3/A3 each represent a combination of a model (e.g., model SCUC0) and an algorithm carried out on the model (e.g., one of algorithms 206). The arrows between the circles represent communication (e.g., data sharing) between the nodes/threads, such as the passing of hints and/or solutions among the nodes/threads.

In the depicted example, algorithms 206 include algorithms for Branch-and-Bound (B&B), Relaxation Induced Neighborhood Search (RINS), polishing, variable fixing, and Alternating Direction Method of Multipliers (ADMM). However, algorithms 206 can include different algorithms than those shown without departing from the scope of this disclosure.

In operation, concurrent optimizer 202 can extract upper bounds and lower bounds from node and thread levels, send solution-related data structures from one node (or thread of a node) to another, and then direct parallel execution of some or all of the computing nodes and associated threads. While executing, the nodes/threads can send messages to one another, e.g., to share data such as solutions or hints. One or more of the solutions generated by the nodes or threads can be used to generate one or more outputs 212 of the software tool.

Execution management 208 of concurrent optimizer 202 can coordinate the execution of the various nodes/threads. The lower bound solutions generated by the individual algorithms can be associated with respective certificates indicating the quality of any found upper bound solutions, and the quality of a given upper bound solution can be determined based on the size of a gap between the objective of the solution and a lower bound certificate for the MIP problem. The objective value or "objective" can refer to a desired value of an objective function representing a fitness metric that is attempted to be solved for the MIP problem.

In examples where the software tool solves a SCUC problem, the software tool can receive inputs 210 from various sources to forecast next-day operating conditions of a power grid (e.g., loads and generators coupled to the power grid that are participating in an electricity market, eternal transactions, flow control device settings, generation and transmission outages, etc.). Based at least in part on the SCUC model and the inputs, the software tool can generate one or more solutions to the SCUC problem, and then determine the "best" solution. As used herein, "best solution" refers to a selected solution to a problem that satisfies an objective criteria or that exceeds other solutions according to such an objective criteria. An authority (e.g., ISO/RTO) utilizing the software tool can then communicate with the nodes of the power grid that are participating in the market to direct their operation in accordance with the outputs of the software tool. For example, this can include sending dispatch instructions to a generator coupled to the power gird, the dispatch instructions indicating ON/OFF states and power output levels for the generator during an upcoming planning horizon.

In a given day-ahead market clearing process, the SCUC problem can be solved several times by the software tool. This can include solving the SCUC problem a plurality of times with different inputs each time, e.g., via parallel or sequential processes. In some examples, other analytical tools in addition to the software tool, or an augmented version of the software tool, can be used to solve the SCUC problem (or some portion of the SCUC problem).

IV. Software Tool Inputs

The inputs to software tool 200 will depend on the nature of the MIP problem being solved. For example, in the context of solving a SCUC problem, inputs 210 of software tool 200 can include demand/load bids, generation bids, virtual bids, dispatchable demand bids, and system data, for example. The various bids can be received for each of a plurality of time periods of an upcoming planning horizon (e.g., hourly bids for each hour of the day for which the market is being cleared, or bids for another time period within the pl). The term "planning horizon" can refer to a time period for which the market is being cleared. While some of the examples described herein pertain to a planning horizon of 36 hours, other planning horizon durations (e.g., 6 hours, 12 hours, 24 hours, 48 hours, etc.) are also contemplated.

The fixed demand/load bids can be received from each of a plurality of loads participating in the market (e.g., load 106 of FIG. 1). Each fixed demand/load bid can optionally include data regarding an amount of electricity demanded by the customer for one of the time periods.

The generation bids can be received from each of a plurality of generators participating in the market (e.g., generator 108 of FIG. 1). Each generation bid can optionally include a generation profile of the generator (e.g., data indicating the performance characteristics and/or capabilities of the generator), as well as data indicating an amount of money or other resource demanded by the generator (e.g., per unit of power) in exchange for generating power during the time period to which the bid pertains.

The virtual bids can include bids to supply power to the grid or to another market participant in exchange for compensation, and/or bids to supply compensation to the RTO/ISO or another market participant in exchange for receiving power from the grid, for example. The term "virtual" can signify that the bids are received from a financial party such as a day trader, rather than directly from a load or generator (or an asset owner thereof).

The dispatchable demand bids can be received from each of a plurality of loads participating in the market (e.g., load 106 of FIG. 1). Each dispatchable demand/load bid can optionally include data regarding an amount of electricity demanded by the customer for one of the time periods, and data regarding an amount of money the customer is willing to pay for the demanded amount of electricity. Put another way, the dispatchable demand bids can include bids to adjust power consumption at certain nodes in the grid. In contrast to fixed demand, which should be satisfied in SCUC, dispatchable demand provides the flexibility to avoid unnecessary power consumption at high load peak periods, and to receive power during off-peak periods.

The system data can include data such as load balancing data, reserve requirements (e.g., an amount of electricity required to be stored as a reserve at one or more nodes of the grid), and security constraints. As used herein, a "security constraint" can refer to a contingent event within the grid (e.g., failure of a generator or transformer, or a line outage) that could result in a potential overload at another portion of the grid.

At least some of inputs 210 can serve as inputs ("starts") to threads. Further, at least some of inputs 210 can populate or update one or more of the models 204.

V. Concurrent Optimizer

Existing concurrent optimizers typically run several algorithms simultaneously, and then stop when the fastest algorithm finds a solution. However, in solving complex MIP problems such as SCUC problems, there is currently no single algorithm that can perform consistently better than other algorithms over a large set of market instances to obtain an optimal solution with sufficient speed to meet timing requirements (e.g., timing requirements for day-ahead market clearing) and accuracy requirements. To address this issue, the concurrent optimizer of the disclosed software tool is an evolved MIP solution procedure which not only can execute several algorithms concurrently to compete for the fastest runtime, but also can allow communication among individual algorithms to leverage advantages from each algorithm to achieve a commonly best solution. In addition, the concurrent optimizer can control parallel executions within individual algorithms.

As will be readily understood to one of ordinary skill in the art having the benefit of the present disclosure, terms such as "optimize," "optimizer," and "optimization" refer to iterative improvements in a solution to a LP or MIP problem, but do not necessarily need to reach the theoretically most optimum solution for a particular problem to be considered an optimizing solution.

One innovation of the concurrent optimizer is that it can control two levels of nested parallelism. As discussed further herein, B&B, RINS, enhanced polishing, variable fixing, and ADMM are among the algorithms implemented in the disclosed software tool. The concurrent optimizer manages the execution of these algorithms by allocating resources (e.g., the number of computing nodes and threads) to these algorithms; executing these algorithms concurrently; collecting and managing the upper and lower bounds for solving the underlying SCUC; collecting and sharing solutions among the algorithms; and managing parallel execution of individual algorithms (e.g., parallel subproblem execution in the RINS and polishing algorithms, and parallel execution of partitioned subproblems in the variable fixing algorithm).

The concurrent optimizer of the disclosed software tool includes additional functionality relative to existing concurrent optimizers. As one example, the additional functionality provided by the disclosed concurrent optimizer (e.g., concurrent optimizer 202 of FIG. 2) can include procedures for executing algorithms on several computing nodes/threads simultaneously and enabling the nodes/threads to communicate with each other during the solution process. Each node/thread can include instructions that, when executed, carry out an algorithm, and the respective nodes/threads can be associated with different algorithms (e.g., algorithms of different classes). As another example, the additional functionality provided by the disclosed concurrent optimizer can include procedures for enabling sharing of intermediate incumbent solutions, partial solutions, and hints among the nodes/threads (e.g., hints regarding variables or constraints that can be fixed or relaxed). Further examples of additional functionality provided by the disclosed concurrent optimizer can include procedures for enabling individual threads to call other threads as a subroutine, and procedures for executing threads to create new algorithm runs during the solution process.

Concurrent optimizer 202 can be adapted to control the manner in which the threads of computing nodes implementing the software tool are executed, and in that sense can be viewed as a master thread. For example, the concurrent optimizer can include a master node on which a master algorithm is launched for coordination, information collection, performance management, logging, and termination. This master node can provide upper and lower bounds to nodes and the associated threads, and direct parallel execution of various subsets of the threads. Further, concurrent optimizer 202 can manage and coordinate data from threads executing on different computing nodes. This can include coordinating the sharing of solutions among the threads (e.g., intermediate solutions and/or final solutions). In addition, concurrent optimizer 202 can collect the solutions generated by the nodes/threads and determine the best solution from among them, thereby leveraging the solutions to provide an overall reduction in the time it takes to achieve a high quality solution.

Put another way, the concurrent optimizer has nested parallelization. For example, the concurrent optimizer executes multiple algorithms simultaneously in parallel, while also managing parallel execution of the subroutines of individual algorithms. At the level of the individual algorithms, each algorithm has a master node for managing parallel execution. At the concurrent optimizer level, there is one concurrent optimizer master node which controls all algorithms. The concurrent optimizer master node can communicate with the algorithm master nodes to manage communication of bounds and solutions and control executions.

Figure 3:
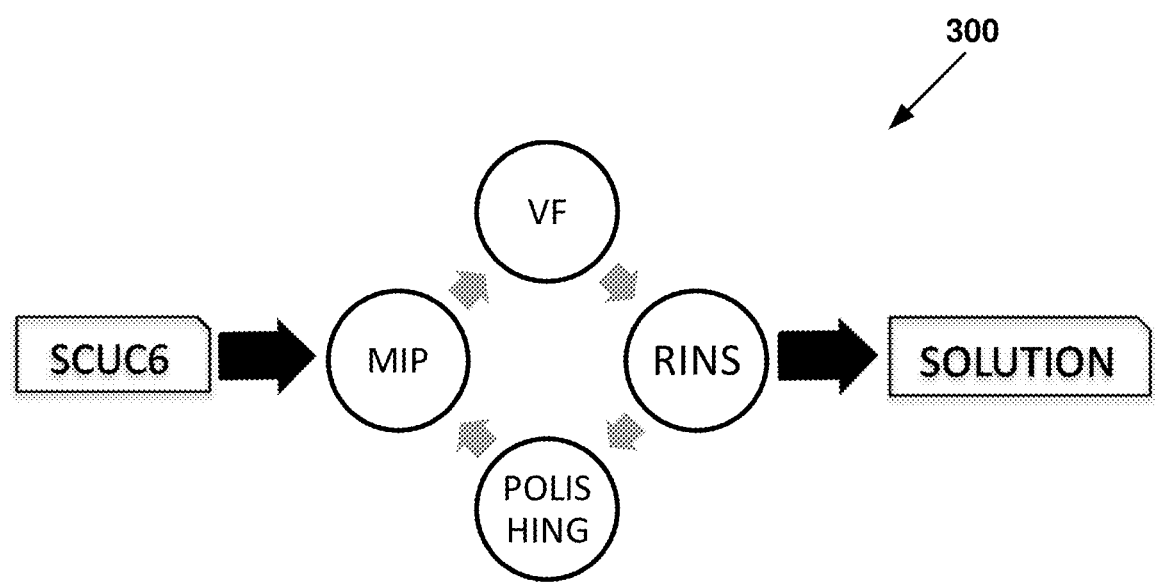
FIG. 3 is a diagram showing an exemplary process flow of a concurrent optimizer, as can be implemented in accordance with certain examples of the disclosed technology.

FIG. 3 depicts an example diagram 300 of operation of a concurrent optimizer, such as concurrent optimizer 202 of FIG. 2. In the depicted example, a SCUC model/formulation ("SCUC6") is solved by a concurrent optimizer as a MIP problem. In particular, the concurrent optimizer uses variable fixing ("VF"), RINS, and polishing algorithms in conjunction with an overall MIP solving process, which can be a B&B process. As indicated by the small arrows, the algorithms (in particular, threads/nodes carrying out the algorithms) share data with one another, and ultimately produce a solution.

a. Detailed Explanation of Concurrent Optimizer Operation

As noted above, the disclosed concurrent optimizer allows for multiple solvers to execute simultaneously in a high-performance computing environment. In this process, solvers exchange incumbent solutions in the form of hints through the concurrent optimizer master module. The solvers at the receiving end can create and execute new sub-problems as independent processes based on these hints. The concurrent optimizer receives updates regarding incumbents from all the solvers as and when they are available. The master module decides whether to continue optimization or exit, with one of the more optimal solutions found using exit criteria based on lower and upper bounds received from individual solvers.

Figure 4:
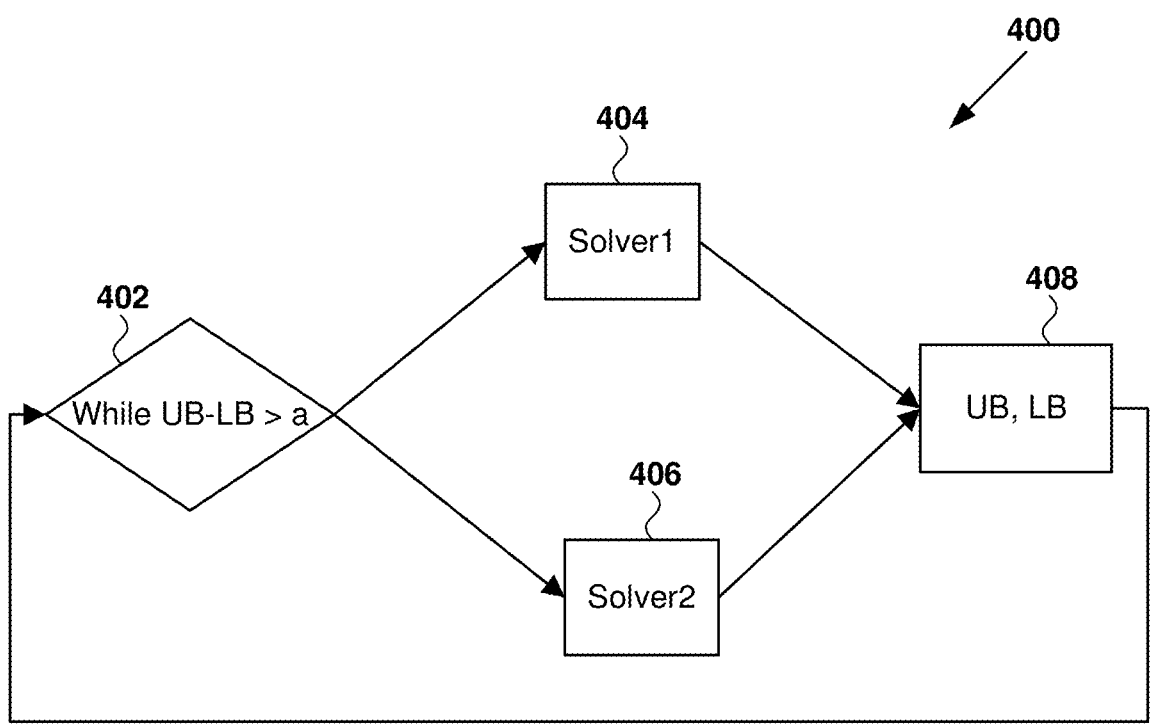
FIG. 4 is a diagram showing exemplary operations performed by a concurrent optimizer, as can be implemented in accordance with certain examples of the disclosed technology.

FIG. 4 depicts a flow diagram 400 of exemplary operations performed by a concurrent optimizer. As shown in the flow diagram 400 at block 402, while the difference between the upper bound and lower bound is greater than a predetermined gap 'a', two solving processes 404 and 406 are executed in parallel (labeled Solver1 and Solver2, respectively). The solving processes result in generation of upper bounds and/or lower bounds, as shown at block 408, which are fed back to the solvers.

The operation of the disclosed concurrent optimizer may seem counter-intuitive, in that the added communication overhead may appear to slow down the optimization process. Every solver is trying to optimally use its resources; the question is whether concurrency interferes with the execution. However, concurrency has its advantages in that it can compensate for deficiencies in individual solvers. For example, a solver executing a polishing algorithm may obtain good upper bounds, but MIP can complement it with a good lower bound. When applied judiciously, concurrent optimization adds more benefit than harm.

The concurrent optimizer is designed to run until the last running solver exits. In particular, the concurrent optimizer can run indefinitely until a stopping criterion is met. One example of a well-defined criterion is when a preset gap is reached based on lower and upper bound updates received from solvers. When cross-talk is enabled, the concurrent optimizer allows a pair of solvers to share information, such as bounds and solution objects, directly between them. Extensive logging through the concurrent optimizer allows for post-execution analytics, troubleshooting, audit trail, sensitivity analysis, and archival. Logging captures comprehensive information for mining. This can include the name of the running case, the time to an incumbent since the beginning of execution as well after model construction, the time between incumbents, progressive bounds, updated bounds after an incumbent arrives, the source of a new incumbent (the solver), the gap at a given time in the optimizer life cycle, and the run configuration (combination of solvers).

Accordingly, in some examples, the concurrent optimizer is responsible for: setting up individual solvers; specifying the number of processes for each solver (one master and many sub-solvers); allocating a range of processes for each solver; creating a group communication object for masters of all solvers; assigning a common case(file) for all the solvers; invoking all the solvers in parallel; monitoring and receiving updates from each solver; sending updates from one solver to the other solvers; and deciding whether to exit or continue based on the updates.

The concurrent optimizer loops through the available solvers, imports the solver code and then invokes each of them at their respective entry point. Each solver receives its local communicator (comm), casefile to solve, and any other information such as whether it should handle hints from other solvers. The concurrent optimizer runs continuously in a loop while waiting to receive updates from the solvers. When an update is received, it is immediately logged (e.g., in JSON format).

The concurrent optimizer runs until exit criteria are satisfied. One of the criteria is for the lower bound to exceed the upper bound by a preset gap 'a' (e.g., as shown at block 402 of FIG. 4). These bounds are continuously fed to the master from the solvers. When the criteria is met, the concurrent optimizer sends a signal to all the solvers to gracefully exit. The solvers are responsible for cleanup and timely exit. When all the solvers have exited, the concurrent optimizer will document its findings and then free up all resources such as groups and communicators before a final exit. In case the concurrent optimizer is not able to exit because of any solver getting hung, the launching script will bring the concurrent optimizer to a hard stop after a timeout. The script also interferes when the concurrent optimizer hangs even though a gap is successfully reached. This demonstrates the robustness of the concurrent optimizer.

The disclosed software tool can include a logging framework that is bolstered to support JSON formatting for extensive analytics. The logging framework can register the time of an event, source of the event (e.g., solver, line of code, function name), process number with respect to the solver group as well as in the global context (world), logging level (information, warning or error), and any other additional information passed to it. The JSON format can allows for filtering and performing quick analytics. Tools like j son-log-viewer can be used for selective viewing to capture attributes of interest.

As discussed above, the purpose of the concurrent optimizer is to execute several solvers simultaneously towards an optimal solution for the SCUC problem. The concurrent optimizer is responsible for collecting bounds information and enabling sharing (cross-talk) of detailed incumbent solution information across several solvers with a minimal space and time footprint.

The disclosed concurrent optimizer advantageously coordinates diverse solver architectures, with every solver providing updates to the concurrent optimizer while sensing for when gap is reached or timed out. Meanwhile, if a solver finishes its task, it sends an exit signal to the concurrent optimizer.

The disclosed concurrent optimizer also includes enhancements directed to configuration, logging, and file management. For example, the concurrent optimizer can determine solver combinations to run from configuration files, and multiple configurations and case files can be executed simultaneously. The configurations can convey pairs of solvers that participate in cross-talks. Updates received from all solvers can be logged centrally by the concurrent optimizer with consistent formatting. A parser can then sift through the logs to determine the "best" solvers, bounds, and timeline. All required input files can be loaded upfront during initialization, and memory I/O can be ensured to get precedence over disk I/O.

b. Inter-Thread Communication

Threads/nodes implementing the disclosed software tool can communicate with one another, including while they are executing, to share solutions, hints, and other data. As discussed above, concurrent optimizer 202 can facilitate this data sharing.

In one non-limiting example, data sharing can be performed via message passing. For example, in a given HPC cluster, data can be moved from one node to another node in accordance with the Message Passing Interface (MPI) standard and corresponding libraries. As another example, data can be moved among threads in a shared memory environment by using multiprocessing libraries in Python. The disclosed concurrent optimizer can also manage the data communication by using the MPI protocol and multiprocessing simultaneously.

Python's default MPI between nodes uses pickling as a mechanism for communicating objects. Pickling has technical shortcomings while passing complex objects like markets and solutions. Python Dill is an extension of pickling that improves efficiency of object communication, especially over a network. Dill even allows passing methods in addition to data. In examples where the disclosed software tool utilizes Python's default MPI, Python Dill can be used instead of Python Pickle to support complex objects.

It will be appreciated that other modes of data sharing can be used, instead of or in addition to the MPI standard/Python multiprocessing libraries, without departing from the scope of this disclosure. For example, these other modes can include file I/O (e.g., POSIX I/O, non-parallel I/O, independent parallel I/O, or cooperative parallel I/O), message passing via kernel buffers, mailbox message passing, pipe message passing, sockets such as datagram sockets (UDP) or stream sockets (TCP), etc. A process hosted by an individual processor can each support one or more execution threads.

VI. Overview of Threads and Algorithms

Computing nodes implementing the disclosed software tool can include threads, which in turn can include executable instructions for carrying out various algorithms such as algorithms 206. The algorithms can include existing algorithms as well as algorithms specifically developed for the disclosed software tool. The algorithms can be run in parallel, e.g., via concurrent execution of the associated threads. Further, certain algorithms can run sequentially, e.g., via sequential execution of the associated threads. Furthermore, certain algorithms can be called as subroutines of other algorithms, e.g., via the associated threads being called as subroutines of threads associated with other algorithms.

In the disclosed software tool, MIP problems such as SCUC problems can be implemented in several formulations on which the algorithms run. In some examples, the Gurobi Solver is used as the general MIP solver to solve a MIP problem; towards this end, the Gurobi Solver can implement a B&B algorithm as a basic method to solve the MIP problem. In addition the main B&B algorithm, the algorithms carried out by the software tool can include an enhanced RINS algorithm that was specifically developed for solving SCUC problems; an enhanced polishing algorithm that was specifically developed for solving SCUC problems; an enhanced variable fixing algorithm that was specifically developed for solving SCUC problems, and an ADMM algorithm that was specifically developed for solving SCUC problems.

Further examples of algorithms carried out by the threads include a variation of a polishing algorithm that is tailored for solving SCUC problems. The threads of the disclosed software tool can also incorporate other algorithms without departing from the scope of this disclosure.

VII. Example Solving Operation

The following non-limiting example is provided to clarify the interplay between the concurrent optimizer and the other nodes of the disclosed software tool.

First, the concurrent optimizer launches multiple variants of algorithms concurrently on a cluster of computing nodes. The algorithms can include the RINS, enhanced polishing, variable fixing, and ADMM algorithms disclosed herein, for example. Each algorithm is associated with an algorithm master node and one or more algorithm subproblem nodes. The subproblem nodes form a group and communicate with the algorithm master node using MPI. Similarly, the algorithm master nodes form a group and communicate with the concurrent optimizer master node using MPI.

The algorithm master nodes pass limited incumbent information (e.g., bounds) from the running model to the concurrent optimizer at regular intervals, and the concurrent optimizer terminates as soon as an acceptable threshold (gap) is reached based on the bound information. While launching the algorithm master nodes, the concurrent optimizer passes comprehensive knowledge to all the algorithms, so that the algorithm master nodes can communicate with each other (bypassing the concurrent optimizer itself). Further, the algorithm master nodes can share the model state during execution, in the form of hints that can be leveraged to accelerate optimization.

If the concurrent optimizer encounters a preset global timeout, or if the gap is reached, the concurrent optimizer passes an EXIT signal to all the algorithm master nodes. The algorithm master nodes then send an EXIT signal to all subproblems, for an immediate exit. All subproblem nodes exit together, and then all algorithm master nodes exit together; the concurrent optimizer exits only after the last algorithm master node exits.

If an algorithm master node completes its job prematurely, it sends EXIT to all the subproblems. In response, the subproblems exit together, and then the algorithm master node sends EXIT to the concurrent optimizer. The concurrent optimizer keeps account of all algorithm exits and then finally exits when the last algorithm exits.

VIII. B&B Algorithm

The B&B algorithm is a general procedure for solving MIP problems, which can serve as the main MIP algorithm used to solve a MIP problem, such as a SCUC problem. In such examples, a thread running the B&B algorithm can call threads running other algorithms (e.g., the RINS algorithm) as subroutines.

In solving a MIP problem, there are two types of bounds: upper bounds and lower bounds. In the context of a minimization MIP problem, such as a SCUC problem, the upper bound is the objective value of a feasible solution, whereas the lower bound can be the optimal objective value of any relaxation of the original MIP problem (e.g., since the optimal objective value of the MIP problem is no less than optimal objective value of any relaxed problem). The upper bound procedure usually aims to search for better incumbent solutions, whereas the lower bound solving procedure aims to improve the lower bound as a certificate on the quality of the upper bound solution. A MIP problem can be solved by any procedure that iteratively improves the upper bound and lower bound, such that they converge to the optimal objective.

In existing B&B procedures used to solve MIP problems, additional methods such as cutting planes and heuristics are often used to improve the basic algorithm. In the disclosed software tool, additional innovations are incorporated in the B&B algorithms. These innovations can include innovations specifically geared towards solving SCUC problems. For example, as detailed below, RINS algorithms can be used to solve subproblems separated from the main B&B process, such that the subproblems are solved in parallel to the main B&B process. The RINS subproblems can be formulated using specific characteristics of the SCUC (e.g., obtained from a SCUC model accessible to the software tool), as well as using incumbent solutions from other algorithms executed by the concurrent optimizer to form the neighborhoods.

In determining subproblems to be solved via the RINS algorithm, the B&B algorithm can encounter a large number of potential subproblems. The B&B algorithm is then tasked with determining which of the subproblems to solve, and in what order. Towards this end, the modified B&B algorithm of the disclosed software tool can consider the following criteria: the quality of the solutions generated by the B&B algorithm that are associated with the respective subproblems; and the diversity of the solutions generated by the B&B algorithm that are associated with the respective subproblems.

For example, with reference to the diversity criterion, all of the solutions generated by the B&B algorithm can be considered in terms of the which unit commitment variables are ON or OFF (e.g., fixed) for that solution, and at what time periods they are ON or OFF. This data can be analyzed to determine the diversity of given subproblem within a set of subproblems. In particular, the extent to which the ON/OFF state and/or ON/OFF time period of the unit commitment variables of a given subproblem in a set of subproblems overlaps with the OFF state and/or ON/OFF time period of the unit commitment variables of the other subproblems in the set can indicate how diverse that subproblem is relative to the set. The B&B algorithm can be configured to select the most diverse subproblems to be solved using the RINS algorithm.

The additional innovations incorporated in the B&B algorithm can further include procedures for fixing decision variables in the SCUC problem by using historical solutions and intermediate solutions from other algorithms being executed via the concurrent optimizer. Still further, the additional innovations incorporated in the B&B algorithm can include procedures for identifying critical constraints in the SCUC problem by using solutions from algorithms in the concurrent optimizer, and for delaying constraint generation.

IX. RINS Algorithm

RINS can be considered a metaheuristic for MIP problems. Implementations of RINS as heuristic algorithms for MIP are included in the existing Gurobi Solver, and other implementations of RINS exist as applications to specific classes of MIP problems. In contrast, the RINS solver disclosed herein is a specific implementation of RINS as a heuristic algorithm for solving SCUC problems. In particular, the disclosed software tool introduces new techniques for dynamically selecting RINS subproblems to solve, and for solving the selected subproblems.

As noted above, the RINS algorithm can generate and solve subproblems based on data received from the B&B algorithm. The subproblems themselves can be MIP problems (e.g., MIP problems that are smaller than the main SCUC MIP problem being solved by the B&B algorithm). As the subproblems are not the main MIP problem, they can be solved with a lower accuracy than what is acceptable for solutions to the main MIP problem; this can advantageously limit the amount of time it takes to solve the subproblems. The solutions of the subproblems can then be shared with other algorithms, including the B&B algorithm solving the main MIP problem. Accordingly, the solutions from the RINS subproblems can contribute to the upper bound solution.

The RINS subproblems can be separated from the B&B algorithm as independent processes, and then solved by execution of a thread carrying out the RINS algorithm. The thread carrying out the RINS algorithm and a thread executing the master B&B algorithm (from which the corresponding RINS subproblem was separated) can be executed in parallel as independent processes.

In some examples, a modified RINS algorithm can solve the subproblems in a sequence of increasing difficulty. The difficulty of a subproblem can be characterized by the number of variables fixed and/or constraints relaxed, with more variables fixed and more constraints relaxed making the subproblem easier to solve, and fewer variables fixed and fewer constraints relaxed making the subproblem harder to solve. Accordingly, solving the subproblems in a sequence of increasing difficulty can include solving a first subproblem with a first number of variables fixed, then using the solution from the first subproblem as an input to a second subproblem and solving the second subproblem with a second number of variables fixed, the second number being smaller than the first number, and so on. Similarly, solving the subproblems in a sequence of increasing difficulty can include solving a first subproblem with a first number of constraints relaxed, then using the solution from the first subproblem as an input to a second subproblem and solving the second subproblem with a second number of constraints relaxed, the second number being smaller than the first number, and so on. In some examples, variable fixing and constraint relaxing are both utilized, while in other examples, only variable fixing is performed or only constraint relaxing is performed.

By solving a sequence of increasingly difficult (and thus increasingly large) subproblems, the tailored RINS algorithm can ultimately arrive at a solution to the original SCUC problem. In other examples, the tailored RINS algorithm can share solutions of one or more subproblems with one or more other algorithms of the software tool, including the main B&B algorithm, and the other algorithm(s) can then use the solutions as inputs to generate a solution to the original SCUC problem.

In addition to fixing variables, the RINS algorithm can also relax constraints in the subproblems. This can be done in a sequence of increasing difficulty, similar to the variable fixing. For example, the RINS algorithm can solve a first subproblem with a first number of constraints relaxed, then using the solution from the first subproblem as an input to a second subproblem and solving the second subproblem with a second number of variables fixed, the second number being smaller than the first number, and so on.

In the particular context of solving a SCUC problem, RINS subproblems can be formulated using specific characteristics of the SCUC model as well as incumbent solutions from threads associated with different algorithms within the concurrent optimizer, in order to form the neighborhoods.

a. General Description of RINS Metaheuristic for MIP

In general, RINS runs in parallel with a B&B MIP solver. For a given MIP problem P, RINS uses information derived by the B&B solver to construct MIP subproblems. The RINS subproblems are solved by at least one additional instance of the B&B solver. Each incumbent solution to a RINS subproblem is a feasible solution to the original MIP problem and thus is a candidate incumbent solution to the original MIP problem P. Let the original MIP problem P be of the form:

$$\text{Minimize } z = c^*x \text{ subject to } A^*x \leq b, x^{lo} \leq x \leq x^{up}, x \in X$$

Here, z is an optimization variable representing a minimization objective, x is a vector of optimization variables, c is a vector of objective coefficients, $x^{lo}$ and $x^{up}$ are vectors of lower and upper bounds on x, b is a vector of constraint right hand sides, and X is the domain of x. The set X is of the form $X=\Pi_j X_j$, and $X_j=(-\infty, \infty)$ for $j \in J^{cts}$, and $X_j=\{0, 1, 2, \ldots\}$ for $j \in J^{disc}$. Thus, $J^{cts}$ indexes the continuous variables $x_j$ and $J^{disc}$ indexes the discrete variables $x_j$. Let $z^{opt}$ denote the true optimal objective value of P.

The B&B solver proceeds by generating and solving relaxation subproblems and maintaining an incumbent feasible solution and known upper and lower bounds $z^{up}$ and $z^{lo}$ on $z^{opt}$. The algorithm begins with $z^{lo}=-\infty$, $z^{up}=\infty$. A solution is any vector x of variables for P. A feasible solution is a solution x satisfying the constraints of P, where $x^{lo} \le x \le x^{up}$, $A^*x \le b$, $x \in X$. Each time a feasible solution x is found, with objective value z, if $z<z^{up}$, then x is set as the incumbent feasible solution $x^{inc}$, and $z^{up}$ is updated by $z^{up}:=z$.

Each relaxation subproblem $P^{rel}$ is obtained from P by making modifications of two types to P. The first modification is to relax the discrete variables, for example, to allow the discrete variables to take continuous values, replacing the domain sets $X_j$ with $(-\infty, \infty)$ for all j. The second modification is to add a branching constraint of the form $x_j \le x^{branch}_j$ or $x_j \ge x^{branch}_j+1$ for a selected branching variable $x_j$, and branching value $x^{branch}_j$.

A given relaxation subproblem $P^{rel}$ is a Linear Programming (LP) problem because all the discrete variables of P are continuous in $P^{rel}$. Therefore, $P^{rel}$ can be solved efficiently as one step of the B&B algorithm.

A relaxation subproblem obtained from P by only relaxing the discrete variables is a relaxation of P without adding branching constraints, in other words, its optimal objective value $z_0$ satisfies $z_0 \le z^{opt}$. Similarly, if two relaxation subproblems are generated, the first with $x_j \le 0$, and the second with $x_j \ge 1$, for a particular branching variable $x_j$, with optimal objective values $z_1$ and $z_2$, then we have $z_0 \le \min\{z_1, z_2\} \le z^{opt}$. By solving a properly chosen sequence of relaxation subproblems, the relaxation subproblem objectives yield progressively tighter lower bounds converging to $z^{opt}$, and these are used to update $z^{lo}$. When $z^{up}-z^{lo} \le epsObjTol$ for a prescribed objective tolerance $epsObjTol \ge 0$, the B&B algorithm is terminated, and the incumbent solution $x^{inc}$ is returned as a nearly optimal solution of P.

At any point in the B&B algorithm after sufficient progress, an incumbent feasible solution $x^{inc}$ and a relaxation subproblem solution $x^{rel}$ are available. These two solutions can be used to construct a RINS subproblem from P. Specifically, given any two solutions $x_1$ and $x_2$, fix all agreeing discrete variables. That is, for each discrete variable taking the same value in both $x_1$ and $x_2$, this variable is fixed to that common value. That is, for all $j \in J^{disc}$ with $x_{1j}=x_{2j}$, add constraints $x_j=x_{1j}$ to the problem P, obtaining the RINS subproblem $P^{sub}(x_1,x_2)$. The RINS algorithm proceeds by generating and solving a RINS subproblem $P^{sub}(x^{inc},x^{rel})$ each time a new incumbent solution $x^{inc}$ is available from B&B using the latest relaxation solution $x^{rel}$. The feasible set of $P^{sub}(x^{inc},x^{rel})$ is said to be a relaxation induced neighborhood of $x^{inc}$, and the algorithm to solve $P^{sub}(x^{inc},x^{rel})$ is a search of this neighborhood for new, improved solutions of P.

b. Implementation of Enhanced RINS Algorithm

Certain examples of the disclosed technology implement RINS as a heuristic algorithm for SCUC; this algorithm is referred to herein as an "enhanced RINS algorithm." The enhanced RINS algorithm consists of a number $nProcRins \ge 1$ of subproblem processes running in parallel with a B&B process, called the main B&B. These $nProcRins+1$ processes are run in parallel with the other algorithm processes of the software tool, coordinated by the Concurrent Optimizer (CO).

A callback is added to the main B&B solver to retrieve information from B&B and to direct the RINS processes. In the callback, if a new incumbent solution is available from B&B, it is added to a set $X^{feas}$ of unexplored feasible solutions. If a new relaxation solution is available, then the current relaxation solution $x^{rel}$ is updated. The RINS subproblem processes are polled, and if any is found to be idle, then a feasible solution $x^{feas}$ is removed from $X^{feas}$, and $(x^{feas},x^{rel})$ is passed to the idle process.

In each RINS subproblem process, when a pair $(x^{feas},x^{rel})$ of solutions is obtained from the B&B process, a RINS subproblem $P^{sub}(x^{feas},x^{rel})$ is constructed. Then a B&B solver is called on $P^{sub}(x^{feas},x^{rel})$. Each new incumbent solution found for $P^{sub}(x^{feas},x^{rel})$ is a feasible solution for P and is reported to the CO.

i. MIP Start in RINS Subproblems

A MIP start can be provided to the B&B solver for a RINS subproblem. A solution $x^{feas}$ that is feasible for P is also feasible for a RINS subproblem $P^{sub}(x^{feas},x^{rel})$. This gives the B&B solver a finite objective upper bound and a feasible solution with which to begin its internal heuristic algorithms.

ii. Lazy Constraints in RINS Subproblems

Individual constraints among the constraints $A^*x \le b$ of P can be set as lazy in a RINS subproblem, so that these constraints are brought into the RINS subproblem only if a potential incumbent solution violates them. The disclosed enhanced RINS implementation uses a threshold $deltaLazyRins \in [0,1]$ and sets a security constraint $A_i^*x \le b_i$ as lazy in a RINS subproblem $P^{sub}(x^{feas},x^{rel})$ if the relative slack of $x^{feas}$ in the constraint is at least deltaLazyRins, such that if $A_i^*x^{feas} \le (1-deltaLazyRins)^*b_i$. A typical value is deltaLazyRins=0.2.

iii. Early Termination of RINS Subproblem Solves

In general, the RINS subproblems can be nearly as difficult to solve as the original problem P, so it is important to limit the computational resources spent on each RINS subproblem solve. In a B&B solve for any given MIP problem, the most rapid progress in the incumbent objective value is made near the beginning of the algorithm, and this applies to the RINS subproblems as well. The enhanced RINS implementation uses a time limit timeLimitRins in seconds, a node limit nodeLimitRins, and a thread limit threadLimitRins. Typical values are timeLimitRins=180, nodeLimitRins=1, threadLimitRins=4.

iv. RINS Minor Subproblems

Consider a particular feasible solution $x^{feas}$ and relaxation solution $x^{rel}$. The RINS subproblem $P^{sub}=P^{sub}(x^{feas},x^{rel})$ may still have a large number of discrete variables that are not fixed. In the disclosed enhanced RINS implementation, instead of solving $P^{sub}$ directly, minor subproblems $P^{sub}_k$, $k=1, 2, \ldots$, derived from P by fixing variables $x_j$, $j \in J^{fix}_k$, are constructed and solved in sequence.

The same termination criteria are used for the minor subproblems as for the main RINS subproblem. Let $x_0$ denote $x^{feas}$, and $x_k$ denote the incumbent feasible solution available when the B&B solve for $P^{sub}_k$ is terminated. A MIP start for $P^{sub}_k$ is provided by $x_{k-1}$. The set of lazy constraints for $P^{sub}_k$ is defined as with $P^{sub}$ using $x_{k-1}$ and the deltaLazyRins parameter. Any constraint where $x_{k-1}$ has slack at least deltaLazyRins and that was lazy in $P^{sub}_{k-1}$ is lazy in $P^{sub}_k$.

The fixed variable sets $J^{fix}_k$ for the minor subproblems $P^{sub}_k$ are defined as follows. If k=1, all agreeing variables are fixed. In the first minor subproblem, with k=1, $J^{fix}_k$ is the set of all j with $x_{k-1,j}=x^{rel}_j$. This differs from the set of variables that are fixed in the main subproblem $P^{sub}$ in that it includes continuous variables as well as discrete variables. If k=2, all agreeing variables are fixed among discrete variables and virtual or dispatchable demand bids. With k=2, $J^{fix}_k$ is the set of all j with $x_{k-1,j}=x^{feas}_j$ where either $j \in J^{disc}$ or $x_j$ is a virtual or dispatchable demand bid energy variable. If k=3, all agreeing variables are fixed among discrete variables and virtual or dispatchable demand bids with narrow bounds. With k=3, $J^{fix}_k$ is the set of all j with $x_{k-1,j}=x^{feas}_j$ where either $j \in J^{disc}$ or $x_j$ is a virtual or dispatchable demand bid energy variable with narrow bounds, in other words, $x^{up}_j - x^{lo}_j \le$ epsNarrowRins, for a prescribed tolerance epsNarrowRins>0. A typical value is epsNarrowRins=1.0 (MIP). Finally, if k=4, all discrete variables and no continuous variables are fixed. With k=4, $J^{fix}_k = J^{disc}$. The sequence of minor subproblems that is solved for each major subproblem can be configured by the user of the software tool. In certain example subproblems, best performance has been observed with the sequence k=1, 2, 3, 4.

v. Relaxed RINS Subproblems

The methods of defining RINS minor subproblems described up to this point all restrict the main subproblem by fixing additional variables, therefore yielding a minor subproblem that is smaller and easier to solve than the main subproblem. But the enhanced RINS implementation also includes a method of defining a subproblem that is a relaxation of the main subproblem, fixing fewer variables, and therefore likely larger and more difficult.

This relaxed subproblem is defined by fixing the variables $x_j$ to their values $x^{feas}_j$ for a certain set of variables $x_j$ where $x^{feas}$ and $x^{rel}$ agree. For a given generator g and time period t, the commitment variable $x^{comm}_{gt}$ is fixed if $x^{feas}$ and $x^{rel}$ agree for generator g and time periods t−1, t, and t+1. That is, $x^{comm}_{gt}$ is fixed to $x^{feas,comm}_{gt}$ if the following are true: $x^{feas,comm}_{g,t-1}=x^{rel,comm}_{g,t-1}$; $x^{feas,comm}_{gt}=x^{rel,comm}_{gt}$; and $x^{feas,comm}_{g,t+1}=x^{rel,comm}_{g,t+1}$. This variable fixing procedure allows the resulting subproblem to search for solutions that differ slightly from the partial solution implied by the agreeing variables of $x^{feas}$ and $x^{rel}$. For example, the generator startup and shutdown times can be adjusted by up to one time period.

This relaxed subproblem can then be used to define a sequence of minor subproblems using methods k=1, 2, 3, 4 as with the original subproblem. In fact, this relaxation step can be performed at any step in the sequence of minor subproblems. These relaxation options can be configured by the user of the software tool.

vi. Adding Incumbent Solutions from RINS to $X^{feas}$

In the disclosed enhanced RINS implementation, incumbent solutions obtained from the RINS minor subproblems are passed to the main B&B process and there added to $X^{feas}$. These solutions are thus be made available to generate new RINS subproblems.

vii. RINS Subproblem Selection Criteria

Since $X^{feas}$ accumulates solutions from the main B&B solve and the RINS minor subproblem solves, and could also receive solutions from other algorithms coordinated by the CO and from known starting points, $X^{feas}$ can grow much faster than the RINS subproblem processes can consume it. Therefore, the enhanced RINS algorithm implements several methods of selecting a best solution from $X^{feas}$ to combine with $X^{rel}$ to create a new RINS subproblem when a RINS subproblem process becomes idle.

The criteria used to select a new solution $X^{feas}$ from $X^{feas}$ to create a new RINS search subproblem can include quality and diversity. The user can configure the algorithm to use a measure for either of these criteria, or a hybrid of these criteria, as the method of selecting a new search solution $x^{feas}$ from $X^{feas}$.

Quality is measured by the objective value of $X^{feas}$. Generally, lower objective solutions yield RINS subproblems whose further solutions have lower objectives, so it is beneficial to select solutions $x^{feas}$ with low objective values. Therefore, suppose the set $X^{feas}=\{x_k, k=1, \ldots, n\}$ with objective values $z_k$ corresponding to solutions $x_k$. These objective values $z_k$ are a direct measure of solution quality. The enhanced RINS algorithm can be configured by the user to use this measure of solution quality to select a new solution $x^{feas}$ from $X^{feas}$:

$$x^{feas}=x_k \text{ where } k \in \mathrm{argmin}\{z_k, k=1, \ldots, n\}$$

Diversity is measured by the difference between $x^{feas}$ and all previously searched solutions. In neighborhood search heuristics, it is important to obtain diversity in the set of searched solutions, as otherwise, the algorithm will tend to get stuck in the neighborhood of a local minimum. Therefore, suppose the set of already searched solutions is given by $X^{searched}$. For any two solutions x, x', compute the distance between x and x' as:

$$d(x,x') = \Sigma_{j \in Jdisc} |x_j - x'_j|$$

Then, for any solution $x_k$ in $X^{feas}$, compute the distance from $x_k$ to $X^{searched}$ as $$y_k = \min_{x \in Xsearched} d(x_k, x)$$

These values $y_k$ of the distance to $X^{searched}$ are a proxy for solution diversity. The enhanced RINS algorithm can be configured by the user to use this measure of solution diversity to select a new solution $x^{feas}$ from $X^{feas}$.

$$x^{feas}=x_k \text{ where } k \in \mathrm{argmin}\{y_k, k=1, \ldots, n\}$$

Generally, quality and diversity are both beneficial in selecting new search solutions, and thus it may be desirable to devote some computational effort to both criteria. The enhanced RINS algorithm therefore defines a hybrid criterion from both of these criteria. Towards this end, let $y^{rank}_k$ denote the rank of solution $x_k$ when sorting $X^{feas}$ in order of increasing $y_k$. For example, $y^{rank}_k=1$ if $y_k=\min\{y_{k'}, k'=1, \ldots, n\}$, etc. Ties are resolved by arbitrary assignment of rank. Similarly, let $z^{rank}_k$ denote the rank of solution $x_k$ when sorting $X^{feas}$ in order of increasing $z_k$. The hybrid criterion is then defined as:

$$w_k = (y^{rank\,2}_k + z^{rank\,2}_k)^{1/2}$$

The enhanced RINS algorithm can be configured by the user to use $w_k$ to select new search solutions:

$$x^{feas}=x_k \text{ where } k \in \mathrm{argmin}\{w_k, k=1, \ldots, n\}$$

Other hybrid measures combining $y_k$ and $z_k$ have also been implemented and studied and are available in the enhanced RINS algorithm, including using different exponents (e.g., 1 or ∞ instead of 2), using $y_k$ and $z_k$ directly instead of $y^{rank}_k$ and $z^{rank}_k$, and alternating between $y_k$ and $z_k$.

viii. Parallel Computation

In a typical MIP solver, the main B&B algorithm is paused while a RINS subproblem is solved. In the disclosed RINS implementation, the RINS subproblem solves run on separate processes in parallel with the main B&B solve and in parallel with each other. Therefore, the enhanced RINS algorithm is able to consider more RINS subproblems and to devote more process time to each RINS subproblem.

c. Example Methods Implementing the Enhanced RINS Algorithm

FIGS. 5A-F are diagrams outlining examples of utilizing the enhanced RINS algorithm to solve MIP problems such as SCUC problems, according to at least one embodiment of the present disclosure. The actions shown in these diagrams can be implemented by one or more computing nodes (e.g., computing nodes 114 of RTO/ISO 102 shown in FIG. 1).

Figure 5A:
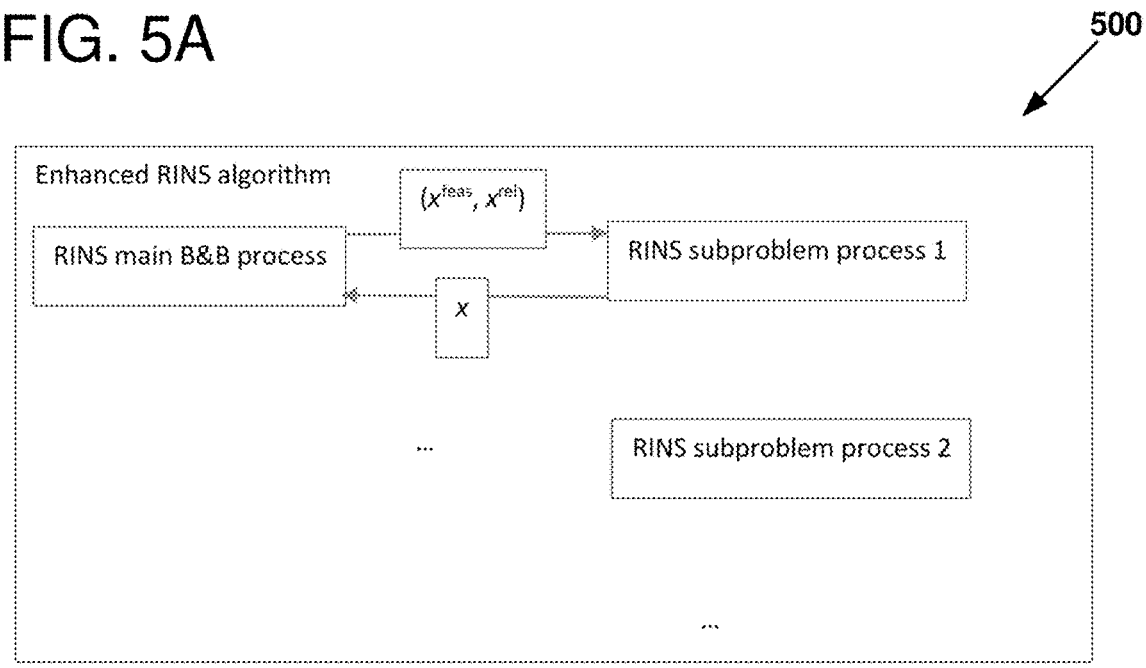
FIGS. 5A-F are diagrams outlining examples of utilizing an enhanced Relaxation Induced Neighborhood Search algorithm to solve MIP problems, as can be implemented in accordance with certain examples of the disclosed technology.

FIG. 5A is a diagram 500 outlining an example of influencing parallel processes in a RINS algorithm, as can be performed in certain examples of the disclosed technology. In this example, the main B&B process sends search neighborhoods ($x^{feas}$, $x^{rel}$) to each subproblem process. Then, each subproblem process sends new solutions x to the main B&B process.

Figure 5B:
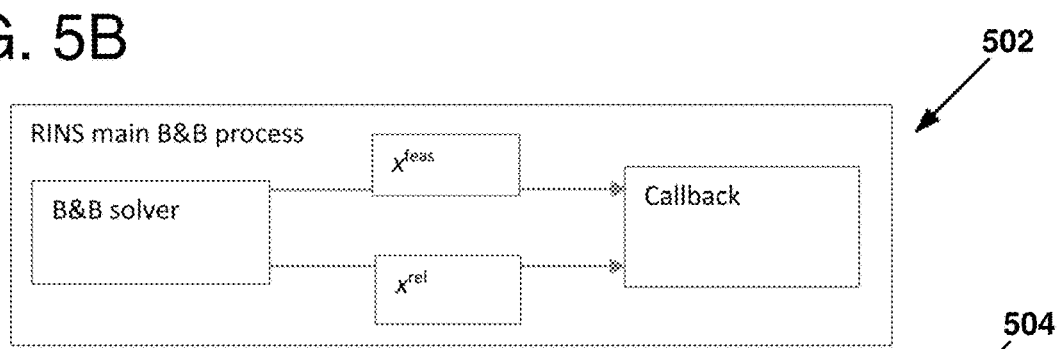

FIG. 5B is a diagram 502 outlining an example of a B&B process for a RINS algorithm, as can be performed in certain examples the disclosed technology. In this example, callback retrieves feasible incumbent solutions $x^{feas}$ and relaxation solutions $x^{rel}$ from the B&B solver.

Figure 5C:
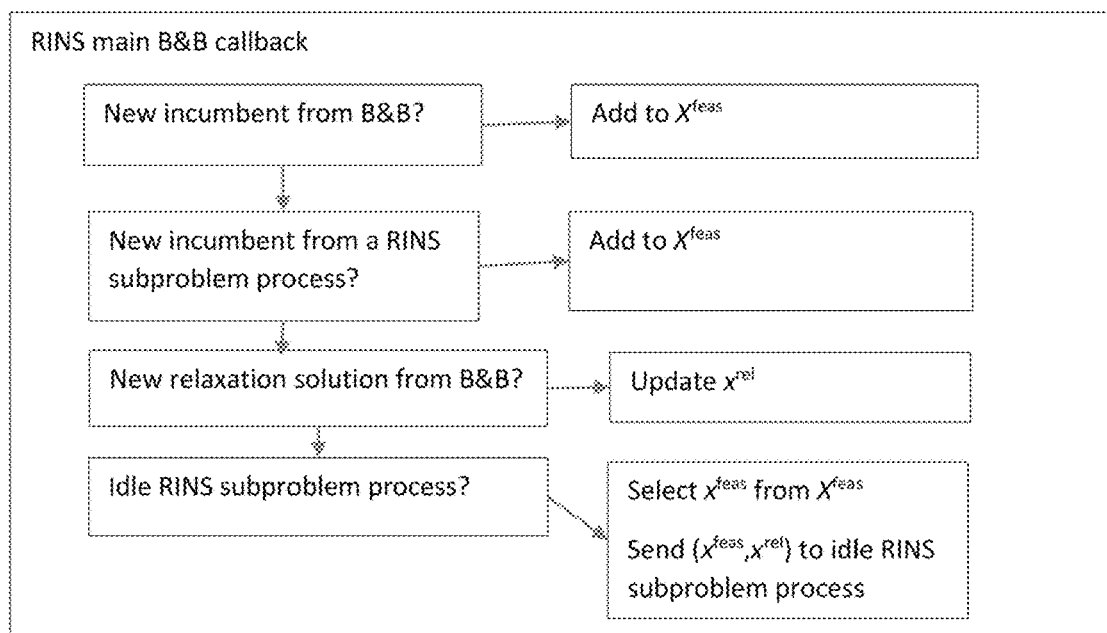

FIG. 5C is a diagram 504 outlining an example of callback in a B&B process for a RINS algorithm, as can be performed in certain examples the disclosed technology. In this example, new incumbents obtained from the B&B process or from a RINS subproblem process are added to $X^{feas}$. Further, new relaxation solutions obtained are used to update $x^{rel}$. In response to determining that a RINS subproblem process is idle, $x^{feas}$ is selected from $X^{feas}$, and ($x^{feas}$, $x^{rel}$) is sent to the idle RINS subproblem process.

Figure 5D:
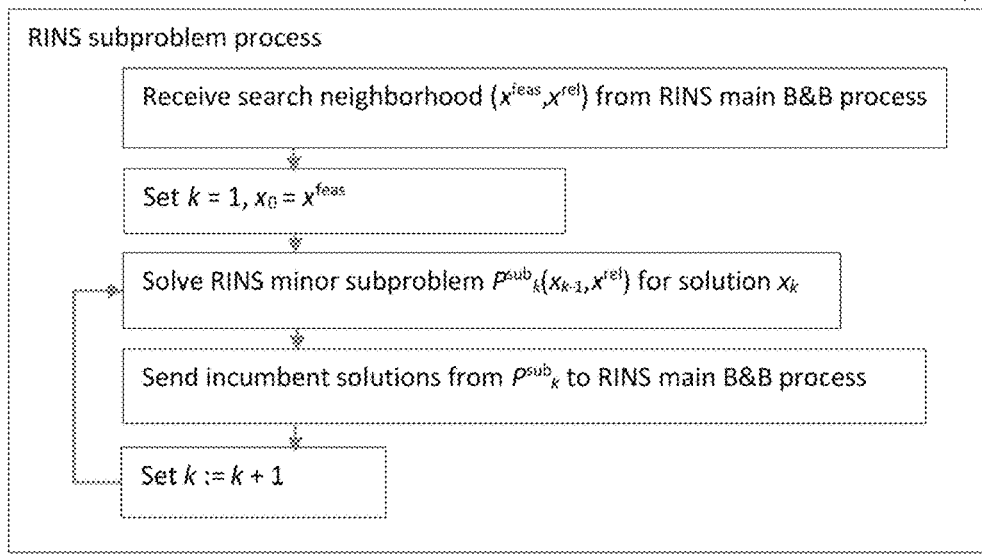

FIG. 5D is a diagram 506 outlining an example of a RINS subproblem process, as can be performed in certain examples the disclosed technology. The process includes receiving a search neighborhood ($x^{feas}$, $x^{rel}$) from the RINS main B&B process, and setting k=1, $x_0 = x^{feas}$. A RINS minor subproblem $P^{sub}_k(x_{k-1}, x^{rel})$ can then be solved for solution $x_k$. Incumbent solutions can then be sent from $P^{sub}_k$ to RINS main B&B process. After setting k:=k+1, the process repeats.

Figure 5E:
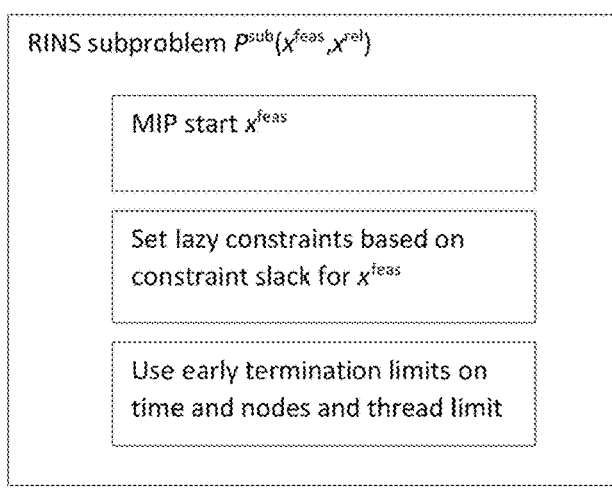

FIG. 5E is a diagram 508 outlining an example of a RINS subproblem solve procedure, as can be performed in certain examples the disclosed technology. In accordance with this procedure, a RINS subproblem $P^{sub}(x^{feas}, x^{rel})$ can be solved using a MIP start $x^{feas}$. The procedure includes setting lazy constraints based on constraint slack for $x^{feas}$. The procedure further includes using early termination limits on time and nodes and thread limit.

Figure 5F:
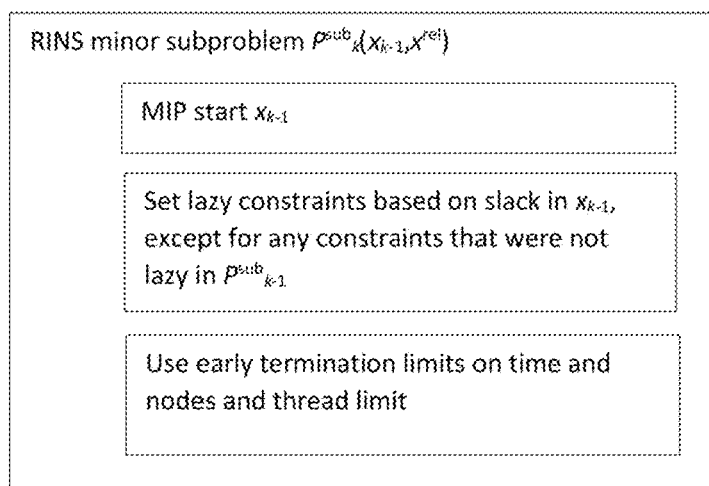

FIG. 5F is a diagram 510 outlining an example of RINS minor subproblem solve procedure, as can be performed in certain examples the disclosed technology. In accordance with this procedure, a RINS minor subproblem $P^{sub}_k(x_{k-1}, x^{rel})$ can be solved using a MIP start $x_{k-1}$. The procedure includes setting lazy constraints based on constraint slack in $x_{k-1}$, except for any constraints that were not lazy in $P^{sub}_{k-1}$. The procedure further includes using early termination limits on time and nodes and thread limit. Therefore, in accordance with the disclosed RINS algorithm, RINS subproblems can be solved by solving a sequence of minor subproblems. Each minor subproblem can have a MIP start from the previous minor subproblem in the sequence, as shown in FIG. 5F. For minor and relaxed RINS subproblems, variables can be fixed in a prescribed manner when certain conditions are met, as detailed above. Further, quality- and diversity-based criteria can be used for selecting feasible solutions to search in further RINS subproblems.

X. ADMM Algorithm

ADMM is an algorithm decomposing an optimization problem into smaller pieces and iteratively solving individual pieces; although ADMM was originally applied to solve convex problem, it can be used as a heuristic to solve MIP problems such as SCUC problems. Experimental results have shown that the estimated time for an ADMM algorithm to reach a gap of less than 1% is 60 seconds. When applied to solving SCUC problems, the ADMM algorithm can serve to break the problem down based on resources and/or time. This can include decomposing the SCUC problem on a per-generator and per-time-period basis.

There are many issues associated with applying ADMM in solving SCUC problems and, more generally, MIP problems. These issues include a tendency to converge to local optimal solutions instead of global solutions, a tendency towards cycling and not converging, and not knowing the quality of solutions. Also, the flexibility of ADMM can lead to many options for decomposing a problem into pieces, not all of which will lead to good algorithms.

The disclosed software tool incorporates a modified version of the ADMM algorithm which aims to address at least some of these issues. For example, the disclosed software tool can include processes for checking the quality of a solution generated by a thread executing an ADMM algorithm by using data shared between different algorithms in the concurrent optimizer; processes for breaking cycles, such as using autocorrelation; and processes for decomposing subsystems such as based on resource types, resource characteristics, generation-load balance criteria, and spatial data. Further, the disclosed software tool can include processes for applying ADMM to support other algorithms in the concurrent optimizer, such as using ADMM as a subroutine for a heuristic method (e.g., polishing), and/or sending ADMM intermediate solutions as incumbent solutions or hints to other algorithms.

XI. Enhanced Variable Fixing Algorithm

Solving SCUC as a MIP problem involves hundreds of thousands of binary variables. As discussed above, the number of binary variables in a MIP problem impacts the solution time. Existing algorithms for fixing variables to reduce MIP problem solution time tend to be heuristic algorithms that generate solutions which are possibly optimal solutions. However, for such heuristic algorithms, there is no way to prove that optimal solutions are found. In contrast, the enhanced variable fixing algorithm disclosed herein is an exact algorithm; in optimization, an exact algorithm is an algorithm for which an optimal solution can be provably found by running the algorithm. In particular, in the enhanced variable fixing algorithm, the fixing value is used to create a partition of the entire feasible region, where the "feasible region" refers to the collection of all solutions which satisfy all the constraints in a given optimization problem.

Towards this end, the enhanced variable fixing algorithm aims to reduce the runtime associated with solving a SCUC problem by reducing the number of free binary variables in the SCUC problem and fixing a subset of binary variables at 0 or 1. In particular, in the enhanced variable fixing algorithm, binary variables are fixed by rounding linear programming relaxation solutions or by using a reduced cost. In rounding, a binary variable is assigned to 0 if the distance of its linear programming relaxation solution to 0 is within a prespecified threshold, or to 1 if the distance of its linear programming relaxation solution to 1 is within a prespecified threshold. The binary variable is left as a free variable if the distance is greater than the threshold. In some examples, the binary variables to be fixed include ON/OFF states of resources coupled to a power grid, such as generators.

The reduced cost of a variable in an optimization model represents the derivative of the objective function with respect to the variable, and is the amount of change in the objective value if there is an infinitesimally small change in the variables. A binary variable is fixed at 0 or 1 depending on its reduced cost from the linear programming relaxation solution.

As an example, consider that binary variables $x_1$, $x_2, \ldots, x_{18}$ are fixed at 0. These variables can be grouped into, for example, three groups. Group 1 consists of $x_1$, $x_2, \ldots, x_6$; group 2 consists of $x_7, x_8, \ldots, x_{12}$; and group 3 consists of $x_{13}, x_{14}, \ldots, x_{18}$. The variables in each group can be either fixed at 0 or be free. Inequality $\Sigma_{i=1}^{6} x_i \geq 1$ is used to enforce that at least one variable from group 1 needs to have a value different than 1. With three groups and each group having two states, a partition of size eight can be created. This partition covers the entire search space of the original SCUC.

The partition method is general, with any given set of binary variables being fixed. The method is not limited that all variables are fixed at 0; rather, variables can be fixed at 0 or 1. For example, a binary variable x fixed at 1 is equivalent to a variable y=1−x being fixed at 0. The partition method is not limited to defining the group size equally, nor is it limited to three groups.

The disclosed software tool includes several methods for grouping variables. For example, one exemplary method includes sorting the fixed variables by the absolute value of their reduced cost, and constructing equal-size groups with a prespecified number as the number of groups. In another exemplary method, the variables are randomly ordered and then equal-size groups are constructed, with a prespecified number as the number of groups. In yet another to the generation capacities, and then equal-size groups are constructed with a prespecified number as the number of groups.

The enhanced variable fixing algorithm has a distributive nature, such that it can be solve in parallel using a high performance computer (multiple computing nodes) and using multiple threads. Further, the enhanced variable fixing algorithm can receive and use hints from other algorithms in the concurrent optimizer.

Figure 6:
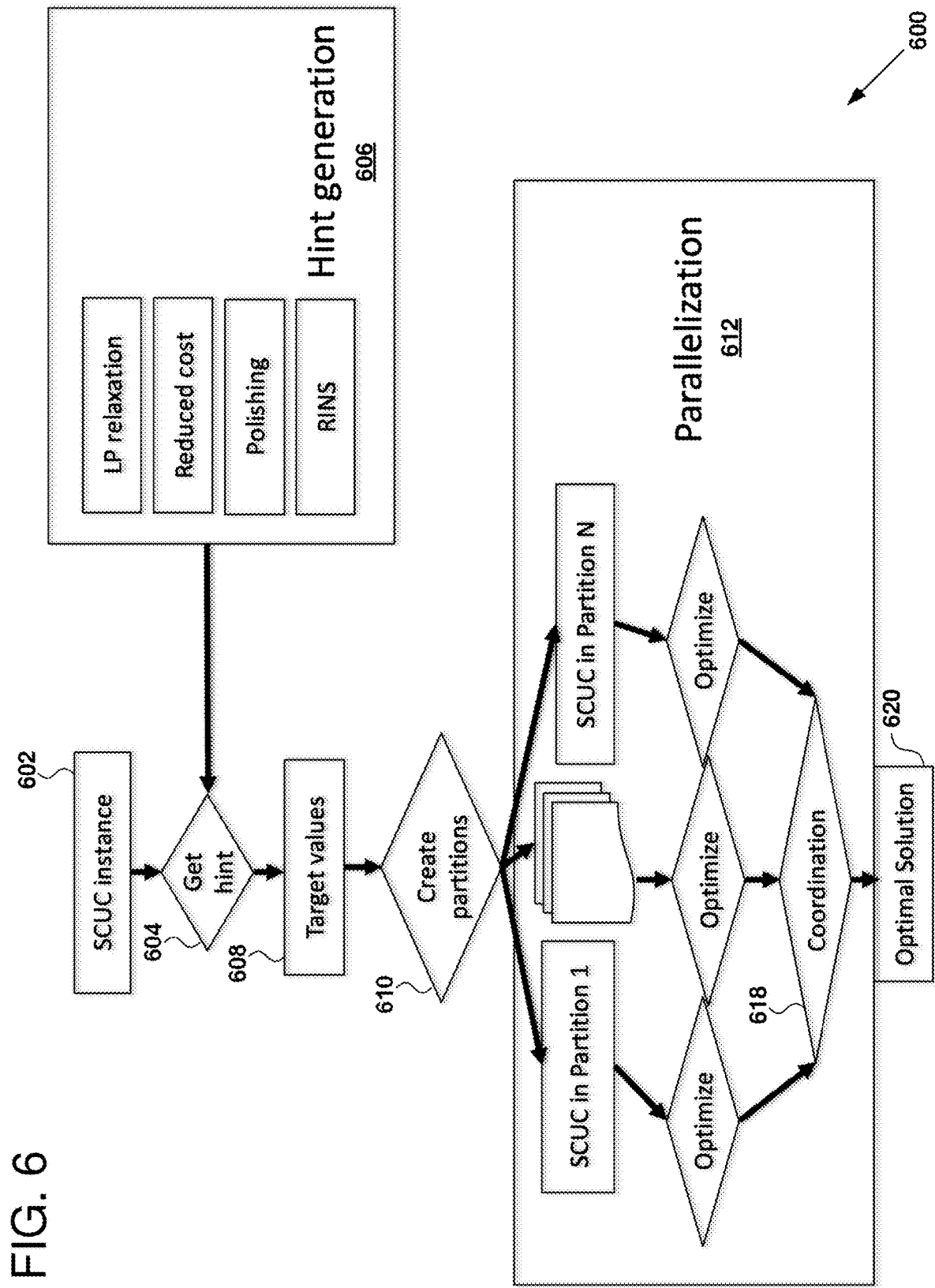
FIG. 6 illustrates an example method of utilizing an enhanced variable fixing algorithm to solve a SCUC problem, as can be implemented in accordance with certain examples of the disclosed technology.

FIG. 6 depicts an example method 600 for solving a SCUC problem which incorporates the enhanced variable fixing algorithm. Method 600 can be implemented by one or more computing nodes (e.g., computing nodes 114 of RTO/ISO 102 shown in FIG. 1).

At process block 602, a SCUC instance is obtained. At process block 604, one or more hints are obtained. In some examples, the hints can be generated based on optimal solutions of LP relaxation, reduced costs of LP, RINS hints, and polishing hints, as shown at hint generation block 606.

At process block 608, a target value is obtained for the SCUC instance based at least in part on the hints. The target value, which is alternatively referred to herein as a "fixing value," can be used to fix variables and to create partitions, as shown at process block 610.

As shown at parallelization block 612, the created partitions can then be solved in parallel to obtain an optimal solution. Coordination 618 can occur between the threads solving the partitions, e.g., via the concurrent optimizer. The coordination 618 can include communication among the parallel threads (e.g., sharing of data such as hints or solutions). Ultimately, an optimal solution is output by the parallelization block, as shown at process block 620.

XII. Enhanced Polishing Algorithm

Another algorithm used by the concurrent optimizer is an enhanced polishing algorithm, which can be alternatively referred to as a neighborhood searching algorithm. The enhanced polishing algorithm can be considered a heuristic method, in that it aims to solve problems such as SCUC problems more quickly by producing high quality upper bound solutions.

As detailed below, the enhanced polishing method can start with historical solutions or solutions from other approaches to generate hints and perform neighborhood search. The hints can lead to the fixing of a large number of binary and continuous variables, and to setting a large number of transmission constraints as "lazy." This in turn can lead to a 2×-12× improvement in the time it takes to find high quality upper bound solutions to a MIP problem, such as a SCUC problem.

The enhanced polishing algorithm can perform neighborhood search to adaptively adjust the variable fixing and lazy constraint settings, to avoid trapping at local optimal solutions. For example, the algorithm can adaptively fix binary variables and continuous variables, and exclude or set lazy constraints, based on hints from any set of binary or relaxed initial commitment solutions. As used herein, setting a constraint as "lazy" is a feature provided by the MIP solver to remove the constraint and place it in a lazy constraint pool until a feasible solution is found, at which point the solution is checked against the lazy constraint pool.

The enhanced polishing algorithm can start with (e.g., receive as inputs) historical commitment solutions, or commitment solutions from other approaches, to generate hints and perform neighborhood search. In particular, the enhanced polishing algorithm can be carried out to "polish" (e.g., improve) historical commitment solutions or commitment solutions from other approaches. The hints generated by the enhanced polishing algorithm can lead to the fixing of large number of binary and continuous variables, and the setting of large number of transmission constraints as "lazy." Initial testing has shown that this approach can successfully fix ~70-90% of the continuous variables in a MIP problem. Further, by performing neighborhood searching in accordance with the disclosed enhanced polishing algorithm, slightly more binary variables can be incorporated in the MIP problem, to avoid becoming trapped at a local optimal solution.

In some examples, multiple processor threads associated with the enhanced polishing algorithm can be executed in parallel, each thread having been seeded with a different initial solution. For example, different historical solutions can be used (e.g., solutions of the SCUC problem that were previously determined for previous planning horizons). However, historical solutions may not satisfy all the constraints in the current SCUC problem, due to system conditions and offer status changes. Prior to utilizing the historical solutions as initial solutions, a feasibility check code can be used to repair the historical solutions, so that the repaired solutions satisfy all constraints in the current SCUC problem.

The enhanced polishing algorithm is designed to take advantage of concurrent and parallel computing to reduce solving time. For example, when implemented in a parallel-computing-based framework, the enhanced polishing algorithm can include parallel neighborhood searching, and can be started from multiple initial solutions. In some examples, independent instances of the enhanced polishing algorithm are executed on multiple threads or computing devices in parallel, with each instance being seeded by (e.g., receiving as an input) one of the multiple initial solutions (or optionally, more than one of the multiple initial solutions). The parallel-computing-based framework can be implemented by one or more nodes of one or more HPC.

The initial solutions used to seed the neighborhood searching algorithm can include historical solutions, such as commitments from previous days. The initial solutions can also include intermediate upper bound or lower bound solutions from the MIP solver, or solutions from another algorithm such as ADMM. The initial solutions can provide useful hints which serve to narrow down the searching space.

The hints generated from the initial solutions can also be sent to a MIP solver for use in solving a full MIP problem. For example, by using the MIP start and lazy constraint settings from the neighborhood searching algorithm as a "warm start," a MIP solver (e.g., one or more threads of the disclosed software tool) solving a full MIP can reach good upper bound and lower bound solutions much more quickly relative to a MIP solver using a "cold start."

a. Example Method of Solving a SCUC Problem With Enhanced Polishing

Figure 7:
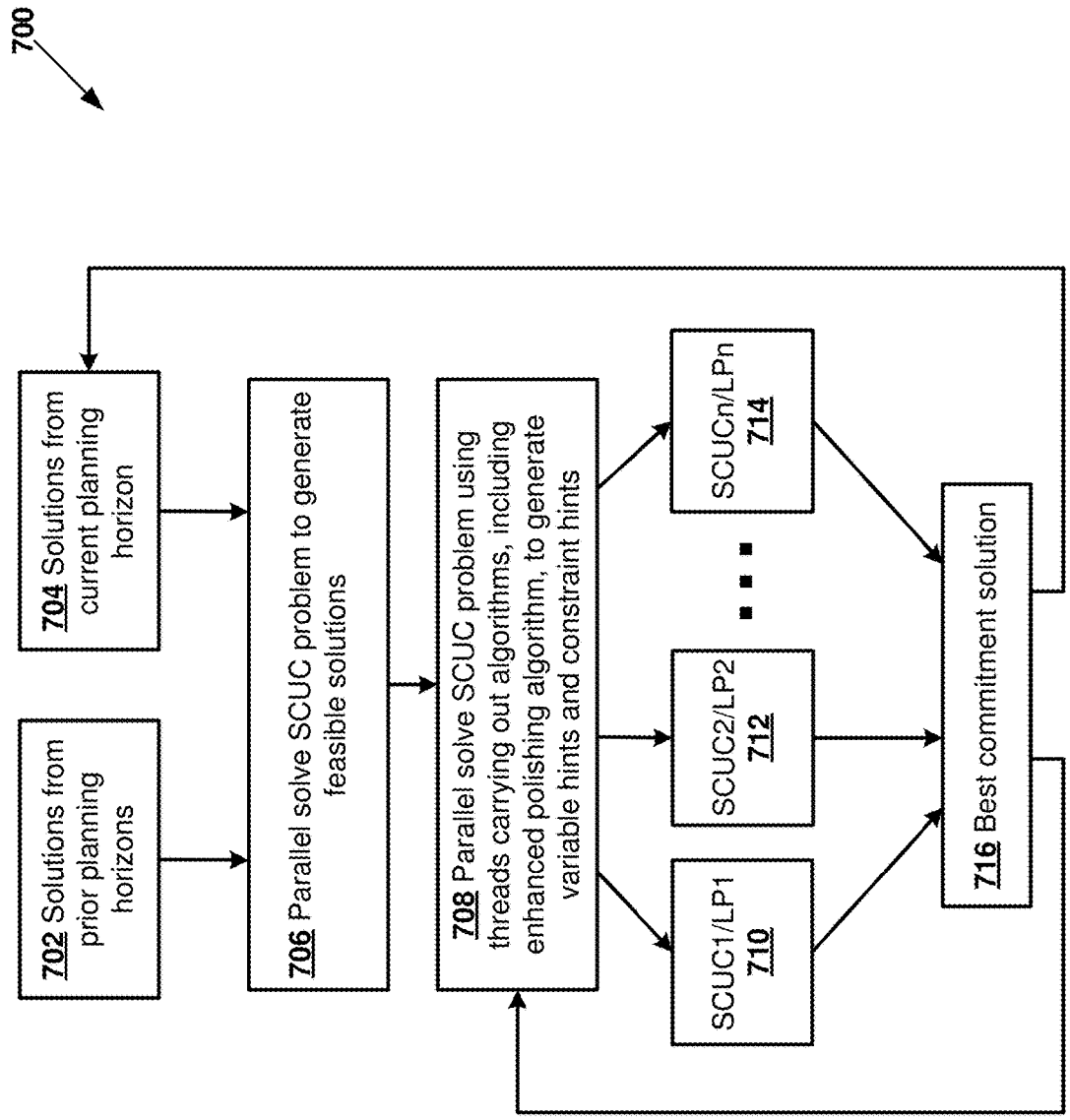
FIG. 7 illustrates an example method of utilizing an enhanced polishing algorithm to solve a SCUC problem, as can be implemented in accordance with certain examples of the disclosed technology.

FIG. 7 depicts a flow diagram 700 including architecture components of a software tool for solving SCUC problems (e.g., software tool 200 of FIG. 2) which utilizes the disclosed enhanced polishing algorithm. For example, a software tool can utilize the architecture components and process blocks depicted in FIG. 7 to solve SCUC problems.

Architecture block 702 depicts solutions from prior planning horizons of a SCUC problem (e.g., historical solutions), which can serve as inputs to various processes performed by the software tool. In some examples, solutions from a specified past time period can be obtained (e.g., solutions from planning horizons occurring in the last 7 days). A relatively large set of solutions from prior planning horizons can be obtained (e.g., 500 solutions).

Similarly, architecture block 704 depicts solutions from the current planning horizon of the SCUC problem, which can serve as inputs to various processes performed by the software tool. These solutions can include incumbent solutions representing a best solution found by the tool at this stage in the solving process (alternatively referred to as intermediate solutions or intermediate incumbent solutions), partial solutions (e.g., solutions to subproblems of the overall SCUC problem), etc.

As shown, architecture blocks 702 and 704 serve as inputs to a process block 706. At process block 706, the SCUC problem can be solved in parallel using a plurality of concurrently-executing processor threads to repair the inputs from architecture blocks 702 and 704, thereby generating one or more feasible solutions (e.g., one or more new incumbent solutions). The repaired feasible solutions can be used as "MIP starts" for a B&B algorithm, or to generate hints to warm start other algorithms. In some examples, each thread can carry out a respective B&B algorithm.

At process block 708, the SCUC problem is solved in parallel using threads carrying out various algorithms to generate variable hints and constraint hints, including the disclosed enhanced polishing algorithm. In some examples, the threads carrying out the algorithms can receive the feasible solutions generated at process block 706 as inputs. Other inputs to the threads can include commitment solutions from the current planning horizon (as indicated by the arrow leading from architecture block 716 to architecture block 708).

The threads executed at process block 708 can communicate with one another during execution, as well as before/after execution, e.g., by message passing. The communication can include sharing data comprising variable hints and constraint hints. As discussed further below, these hints can include indications of which binary or continuous variables can be fixed, and/or which constraints can be relaxed. As used herein, "fixing" a variable can refer to ascribing a value to the variable (e.g., 0 or 1 for a binary variable, or a single numerical value for a continuous variable). Similarly, "relaxing" a constraint can refer to relaxing the constraint (e.g., removing the constraint such that the SCUC problem or subproblem is no longer constrained by that factor).

Architecture blocks 710, 712, and 714 depict exemplary commitment solutions SCUC1/LP, SCUC2/LP2, . . . , SCUCn/LPn that can be generated by process block 708. In some examples, each of the parallel threads executing at process block 708 can generate a corresponding one of the solutions. In some examples, each of these commitment solutions are solutions to subproblems of the overall MIP problem.

Architecture block 716 depicts a "best" commitment solution. As shown, the exemplary commitment solutions SCUC1/LP1, SCUC2/LP2, . . . , SCUCn/LPn serve as inputs to architecture block 716; the software tool can select from among these commitment solutions to determine the "best" commitment solution. The "best" commitment solution can be a solution with the lowest objective cost over a number of other solutions, for example.

Accordingly, as shown in FIG. 7, historical commitment solutions and commitment solutions from other optimization algorithms can serve as inputs to a concurrent solver (e.g., a concurrent optimizer of a software tool) to identify feasible solutions based on current requirements. During the concurrent solving process, multiple threads execute in parallel and share hints, such as whether a constraint can be set as "lazy" (e.g., relaxed), or whether a variable can be fixed. Over time, the concurrent process can efficiently generate a best commitment for the optimized solution, by running the concurrent algorithms on hardware that enables communication between actively running processes.

b. Neighborhood Searching Based on Hints From Initial Solutions

A SCUC model for market clearing can be represented as:

$$(Y) = \min_{x_g, u_g, g \in G} \sum_{g \in G} C_g(x_g, u_g)$$

$$\text{s.t. } f(X) = Y$$

$$(x_g, u_g) \in \chi_g, u_g = \{0, 1\}, g \in G,$$

where X is the vector of $x_g$. After solving a SCUC problem, the commitment variables can be fixed at SCUC commitment solution $u_g^0$ to solve a Security Constrained Economic Dispatch (SCED) problem, which is a Linear Programming (LP) problem:

$$v^p(y, u^0) = \min_{x_g, u_g, g \in G} \sum_{g \in G} C_g(x_g, u_g)$$

$$\text{s.t. } f(X) = Y$$

$$(x_g, u_g) \in \chi_g, u_g = u_g^0, g \in G$$

Market clearing price p is derived from the dual variables of the SCED problem. The price for energy is the Locational Marginal Price (LMP). The profit under the clearing results is:

$$\pi_g(p_g, x_g, u_g) = p_g x_g - C_g(x_g, u_g), g \in G$$

Given price p, generator owners may solve a profit maximizing problem for each generator:

$$\pi^*(p_g) = \underset{x_g, u_g}{\text{Max}}[p_g x_g - C_g(x_g, u_g)]$$

$$(x_g, u_g) \in \chi_g, u_g = \{0, 1\}, g \in G$$

An uplift function can be defined as follows:

$$\text{Uplift}(p_g, x_g, u_g) = \pi^*(p_g) - \pi_g(p_g, x_g, u_g)$$

A generator is "out-of-money" if $\text{Uplift}(p_g, x_g, u_g) > 0$. Due to the existence of binary variables, SCUC problems are in general non-convex. Hence, there may always be a number of generators that are "out-of-money" under the clearing price. Observations from production SCUC cases also show evidence that for commitment solutions having a large gap from the true optimal solution, the number of out-of-money units and their uplift values are usually relatively high.

Transmission constraints also contribute to the long solving time. Without transmission constraints, day-ahead SCUC problems can usually be solved in less than 100 s. It has been studied and concluded that SCUC problem solving time is correlated with the number of transmission constraints and the number of virtual variables.

One existing solution polishing method includes running a quick incremental solve for small incremental changes, on top of an existing commitment solution, and identifying commitment reasons. This polishing method can be used when the incremental changes are small and there is not enough time to run a full MIP solution. In this method, all the "in-the-money" units are fixed and unlikely-to-bind transmission constraints are excluded, thereby reducing the size of the MIP to be solved. The reduced MIP only needs to solve binary variables for out-of-money generators, and only includes likely-to-bind transmission constraints. However, if the initial commitment solution is not close to the optimal solution, this method may result in finding local (rather than global) optimal solution.

In contrast, the enhanced polishing algorithm disclosed herein overcomes shortcomings of existing solution polishing methods, such as their likelihood to converge at local optimal solutions, while reducing the time it takes to reach high-quality upper bound solutions. For example, the disclosed enhanced polishing algorithm improves the convergence by starting with multiple initial solutions. These initial solutions can be either from historical commitment or from other solution methods. Further, the inclusion of neighborhood searching in the enhanced polishing algorithm improves the accuracy of variable fixing and exclusion of constraints. This helps to avoid trapping to local optimal solutions. Through the neighborhood searching, the virtual continuous variables as well as the binary variables can be reliably fixed. This can further reduce the solving time for a reduced MIP. Still further, the enhanced polishing algorithm can use extended LMP (or convex hull pricing) to improve the identification of out-of-money generators. In addition, unlikely-to-bind transmission constraints can either be set as lazy or added through MIP callback instead of totally removed from the model. This can reduce the time it takes to reach high quality upper bound solutions.

Table 1 below shows results achieved by a MIP solver implementing the disclosed enhanced polishing method for a sample "hard" case. The sample case involved finding a feasible solution to a SCUC problem including 1,134 generators and 13,536 transmission constraints. Seven historical commitment solutions from the previous two weeks were fed into the sample case, and then repaired and used to generate hints. The hints included a set of out-of-money generators and a set of lazy transmission constraints. In particular, transmission constraints loaded less than 80% were included in the set of lazy transmission constraints.

TABLE 1

| # Out-of-Money Generators | % of Lazy Transmission Constraints | % Gap of Historical Solutions (Inputs) | % Gap at 200 seconds |
|---|---|---|---|
| 83 | 86.44 | 10.04 | 0.31 |
| 80 | 86.61 | 10.83 | 2.38 |
| 81 | 85.96 | 10.49 | 0.49 |
| 101 | 86.36 | 11.32 | 8.67 |
| 103 | 86.08 | 9.80 | 1.30 |
| 102 | 86.37 | 11.52 | 8.66 |
| 132 | 86.54 | 17.81 | 0.83 |

The repaired initial commitment solutions were used as inputs to the MIP solver. As shown in Table 1, the historical commitment solutions used as inputs had a gap in the range of ~10-20%. Of the total number of transmission constraints, 85% were below 80% loading and thus categorized as lazy constraints. The number of out-of-money units was between 80 and 132. Based on the hints, binary variables for all of the in-the-money generators were fixed, and unlikely-to-bind transmission constraints were excluded. The resulting reduced MIP problem had less than 15% of the transmission constraints of the full MIP problem, and less than 10% of the generators of the full MIP problem. In 200 seconds, it reached a commitment corresponding to an upper bound of less than a 1% gap for the original problem. Accordingly, in this example, the enhanced polishing algorithm quickly provided a high quality upper bound solution based on the hints from the initial commitment solutions.

The advantages achieved by the enhanced polishing method are especially evident when contrasted with the results achieved by a full MIP solver for the same sample case. For this sample case, the full MIP solver reached a solution with a 0.23% gap in 1200 seconds. At 200 seconds, when the enhanced polishing method reached a feasible solution as shown in Table 1, the full MIP solver was still in the pre-solve stage.

However, achieving a good outcome with the enhanced polishing approach depends upon correct identification of the fixed variables and excluded constraints. Also, when solving problems with a large number of continuous variables, it may take a long time for the reduced MIP to reach a gap below 0.1%. Accordingly, the disclosed software tool also includes methods for addressing these shortcomings. For example, as detailed below, the disclosed software tool includes strategies for improving the accuracy of binary variable fixing and constraint exclusion; strategies for fixing continuous variables; and strategies for reducing the solving time for reduced MIPs.

c. Improving Hints Through Neighborhood Searching

For each initial commitment solution $u^0 = [u_1, u_2, \ldots, u_n]^T$, the SCED problem $v^p(y, u^0)$ and profit maximization problem $\pi^*(p_g)$ can be solved to quickly generate a set of hint.

The hint H0 includes three components: out-of-money set $G_{OM0}$, lazy set $X_{Lazy0}$, and the vector of cleared virtual megawatts $V_0$.

By solving $\pi^*(p_g)$, $g \in G$, the profit maximizing commitment $u^*_g$ for each out-of-money generator $g \in G_{OM} = \{g_1, g_2, \ldots, g_k\}$ is obtained. The neighborhood searching algorithm disclosed herein was developed to solve a set of SCEDs (e.g., SCED1, SCED2, . . . , SCEDk) around $u^0$.

For SCEDi, the original commitment $u_{gi}$ for $g_i$ is replaced by its profit maximizing commitment $u_{gi}^*$. The commitment for other generators $k \ne g_i$ stays at the initial value $u_k$. By solving SCEDi: $v^p(y, u1)$ and the profit maximization problem under the price from SCEDi: $\pi^*(pi_g)$, $g \in G$, a new hint $H_i$ with $G_{OMi}$, $X_{Lazyi}$, $V_i$ can be generated. The hints from the neighborhood search can be combined to improve the accuracy of variable fixing and lazy constraint settings.

d. Fixing Binary Variables

Fixing binary variables for a generator $g \notin G_{OM0}$ may result in a local optimal solution if it requires a different commitment for this generator in the optimal solution. Including all out-of-money generators from the neighborhood as committable generators in the reduced MIP can greatly improve the solution quality from the reduced MIP. Accordingly:

$$G_{OM} = G_{OM0} \cup G_{OM1} \cup \ldots \cup G_{OMk}$$

Usually, the majority of the elements across $G_{OMi}$, $i=1, \ldots, k$ are common. The total number of generators in $G_{OM}$ is only slightly higher than that in $G_{OM0}$. However, it can be helpful to capture the generators that have similar costs to generators in $G_{OM0}$.

e. Fixing Continuous Variables

Another SCUC performance challenge is the large number of virtuals (e.g., virtual bids and offers), which can result in a large and dense matrix when coupled with transmission constraints. Fixing continuous variables associated with virtuals can reduce the number of variables and the density of the matrix. However, fixing the wrong set of virtuals can cause the problem to be trapped at local optimal solution.

By using the neighborhood searching algorithm disclosed herein, the cleared virtual megawatts can be retrieved from the neighborhood. If the virtual cleared megawatts are the same across all the SCED solutions from the neighborhood, there is a higher confidence that this virtual can be fixed at the cleared quantity of megawatts.

f. Handling Lazy Transmission Constraints

Similarly, a so-called lazy constraint data from the neighborhood can be used to improve the lazy constraint identification. A constraint is designated as "lazy" only if it is lazy across all the SCED solutions in the neighborhood. Accordingly:

$$X_{Lazy} = X_{Lazy0} \cap X_{Lazy1} \cap \ldots \cap X_{Lazyk}$$

Lazy constraints can be set through a setting of the software tool. For example, if the software tool incorporates a Gurobi Solver, the Gurobi Lazy parameter setting can be used. Lazy constraints can also be added through callback.

g. Neighborhood Search Example

Figure 8:
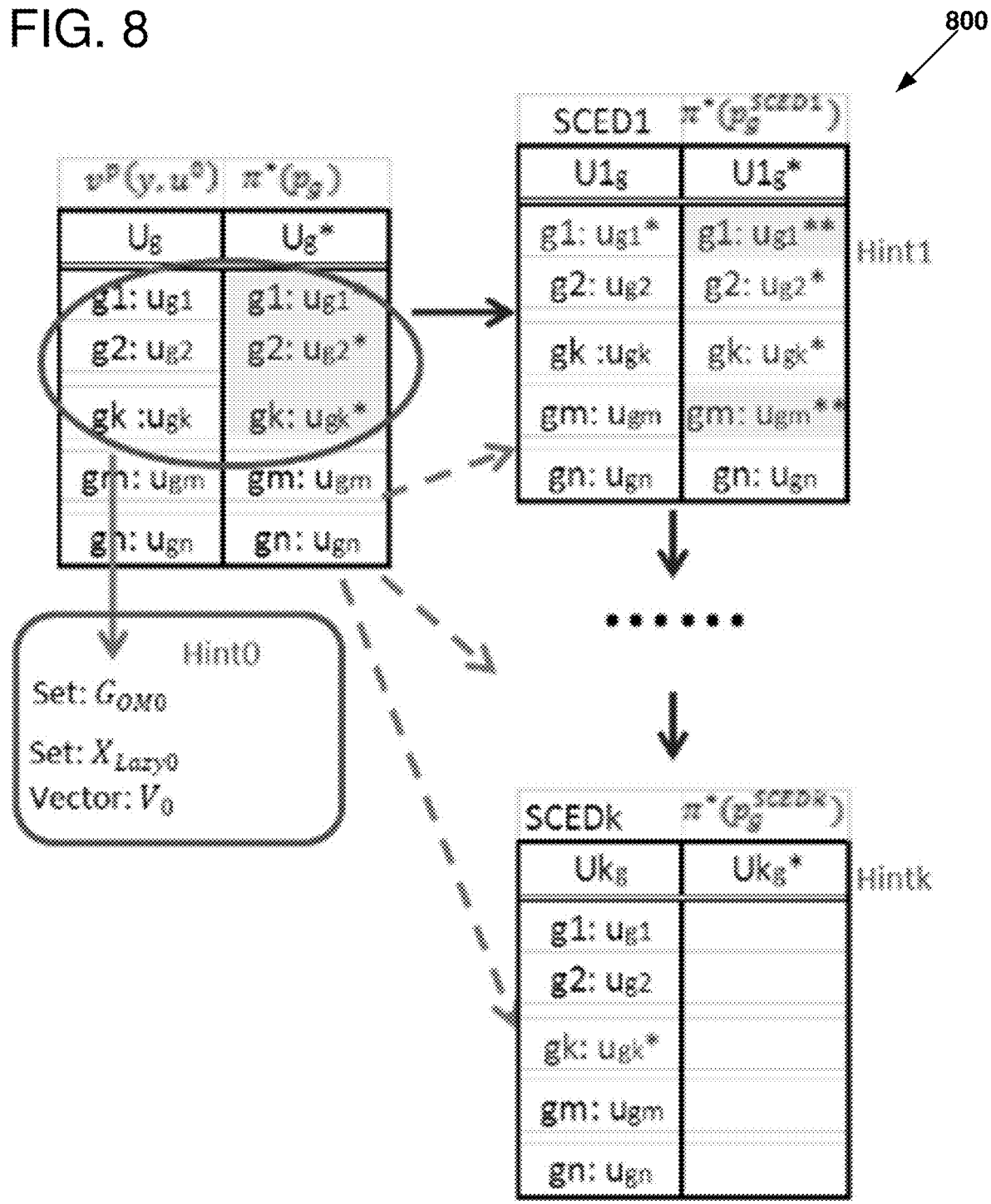
FIG. 8 is a diagram illustrating examples of sequential and parallel neighborhood searching, as can be implemented in accordance with certain examples of the disclosed technology.

FIG. 8 is a diagram 800 depicting various parameters associated with a neighborhood search that can be performed by carrying out the enhanced polishing algorithm using the disclosed software tool, as described in Section XII(c) above.

h. Further Improvements to Variable Fixing Strategy

Both binary variable and continuous variable fixing depend on the price from SCED. The neighborhood searching method may not work well if the variables are fixed wrong. It may happen when the initial commitment is not good and the SCED prices from the neighborhood are far from the price at the optimal commitment. The number of out-of-money generators is a good indication of the quality of the initial solution. Based on historical cases, if the number of out-of-money generators is more than 200, the solution is usually pretty far from the optimal solution. In such circumstances, fixing variables based on the neighborhood search can lead to local optimality. To address this problem, the enhanced polishing algorithm can include only fixing binary variables for generators not in $G_{OM0}$, and treating transmission constraints in as lazy. The initial solution $u^0$ can be used as a MIP start. During the neighborhood searching process, the virtual variables can be retrieved, and a common solution set can be identified to help refine virtual variable fixing in the next iteration.

Further, the commitment solution from the first iteration can be used as the initial commitment solution for the second iteration. The out-of-money set, lazy constraint set, and virtual variable fixing can be refined based on the previous iterations.

i. Improving Out-of-Money Generator Identification Through Extended LMP (ELMP)

Identification of out-of-money generators based on the price from the SCED problem ($v^p(y, u^0)$) works well when the system is mostly convex. However, when the system has non-negligible generators with non-convexity, the out-of-money set of generators may not accurately reflect the set of generators requiring commitment adjustment, since SCED prices only reflect marginal costs and do not reflect fixed costs. This can be illustrated by the following scenarios. For the following scenarios, it is assumed that at the optimal commitment $u^*$, a system has no uplift based on the price $p^*_g$ from $v^p(y, u^*)$. Hence, $\pi_g(p^*_g, x_g, u^*_g) = \pi^*(p^*_g)$.

Scenario 1: If one generator is not committed in the optimal solution with $u^*_{g1} = 0$, we must have $\pi_{g1}(p^*_{g1}, x_{g1}, u^*_{g1}) = \pi^*(p^*_{g1}) = 0$. Assuming a unique optimal solution to $\pi^*(p_g)$:

$$p^*_{g1} x_{g1} - C_{g1}(x_{g1}, u_{g1}) < 0 \text{ for } \forall (x_{g1}, u_{g1}) \in X_{g1}, u_{g1} = 1.$$

If in an initial solution $u^0$, this generator is committed and all other generators have $u_g^0 = u^*_g$, $g \ne g1$. If generator g1 has positive minimum limit, some other generator must be dispatched down to meet power balance. For simplicity, it is assumed that there is no congestion, and that SCED price $p_g^0$ from $v^p(y, u^0)$ should be lower than $p^*_g$. Accordingly:

$$p_{g1}^0 x_{g1} - C_{g1}(x_{g1}, u_{g1}) \le p^*_{g1} x_{g1} - C_{g1}(x_{g1}, u_{g1}) < 0$$
$$\text{for } \forall (x_{g1}, u_{g1}) \in X_{g1}, u_{g1} = 1$$

Therefore, at any dispatch level $x_{g1} > 0$, the enhanced polishing algorithm can identify generator g1 as being out-of-money.

Scenario 2: If one generator is committed in the optimal solution with $u^*_{g2} = 1$, and this generator has the option to be not committed (e.g., profit 0), and assuming a unique optimal solution to $\pi^*(p_g)$, it follows that:

$$\pi_{g2}(p^*_{g2}, x^*_{g2}, u^*_{g2}) = \pi^*(p^*_{g2}) > 0, \text{ and}$$

$$p^*_{g2} x^*_{g2} - C_{g2}(x^*_{g2}, u_{g2}) > 0 \; u_{g2} = 1.$$

If in an initial solution $u^0$, this generator is not committed and all other generators have $u_g^0 = u^*_g$, $g \ne g2$. If generator g2 has positive minimum limit, some other generator must be dispatched up to meet power balance. For simplicity, it is assumed that there is no congestion, and that SCED price $p_g^0$ from $v^p(y, u^0)$ should be higher than $p^*_g$. Accordingly:

$$p_{g2}^0 x^*_{g2} - C_{g2}(x^*_{g2}, u_{g2}) \ge p^*_{g2} x^*_{g2} - C_{g2}(x^*_{g2}, u_{g1}) > 0.$$

Therefore, at dispatch level $x^*_{g2}>0$, g2 can earn more profit than 0. Hence, it has positive uplift and is out-of-money.

Scenario 3: Assume that both g1 and g2 in the above two scenarios are committed differently in $u_g^0$ compared to $u^*_g$. From the above proof, at least one of g1 and g2 is out-of-money. With the neighborhood searching method, both of them can be identified as out-of-money. However, this may not work well if there is uplift under the optimal commitment $u^*$.

An extreme scenario is when all the generator costs are fixed and all marginal costs are zero. Under this scenario, if there is no scarcity price, LMP and market clearing price (MCP) should be close to $0. Most of the on-line generators are out-of-money, and most of the off-line generators are in the money. Accordingly, the neighborhood search method may only be effective if there is scarcity under the neighborhood SCED.

It has been previously proven that convex hull pricing (or ELMP) from the Lagrangian dual problem can result in minimum uplift. Further, a convex primal formulation has previously been proposed to solve ELMP, which includes a convex enveloper cost function formulation and convex hull constraint formulation for individual generators. Under these conditions, ELMP can be solved as a LP relaxation of the SCUC problem. In some examples, the software tool disclosed herein includes this convex envelope cost function, as well as an existing tightest individual generator constraint formulation. Even though it is not a perfectly convex hull formulation, it is sufficient for use as an approximation. In such examples, the LP relaxation of SCUC can be solved to get the approximate ELMP price $p_g^{ELMP}$. This price can then be used to solve $\pi_g(p_g^{ELMP}, x_g, u_g)$ and $\pi^*(p_g^{ELMP})$, generators with positive uplift under $p_g^{ELMP}$ can be added into the out-of-money set. Using this method, the out-of-money generator set can be more accurately identified. A 0.1% true upper bound solution can usually be reached in the first iteration. Without out-of-money generators from ELMP, the first iteration usually cannot reach a true optimal solution. However, solving LP relaxation of the SCUC usually takes about 55 seconds. Accordingly, there is a tradeoff between solving time for each iteration and the number of iterations.

j. Parallel Computing Within an Enhanced Polishing Process

Within an enhanced polishing process, two sections can benefit from parallelization. First, a profit maximization problem $\pi^*(p_g)$ can be decoupled by generators, such that it can be solved through multi-threading. For example, for a case with 1100 generators, solving all generators together as single optimization problem can take about 30 seconds. In contrast, using multi-threading with 24 cores in parallel to solve the same problem can reduce the solving time to less than 3 seconds.

Second, the neighborhood searching can be performed in a parallel mode, in which SCED1 to SCEDk can be solved in parallel. In the parallel mode, a plurality of SCED problems (e.g., SCED1 to SCEDk) can be solved in parallel. Each of the SCED problems may have only has one generator commitment difference relative to $u^0$.

In contrast, in the sequential mode, a "greedy" type of algorithm can be incorporated. If the objective of SCEDi is better than the best upper bound solution, the commitment corresponding to SCEDi can be set as the best upper bound solution. When the initial solution is closer to the optimal solution, the MIP solver may progress very slowly on the upper bound, even when most variables are fixed in the reduced MIP. This "greedy" method can then perform enhanced polishing (e.g., neighborhood searching) to further improve the upper bound.

k. Interaction With Other Methods Under Concurrent Optimizer

Figure 9:
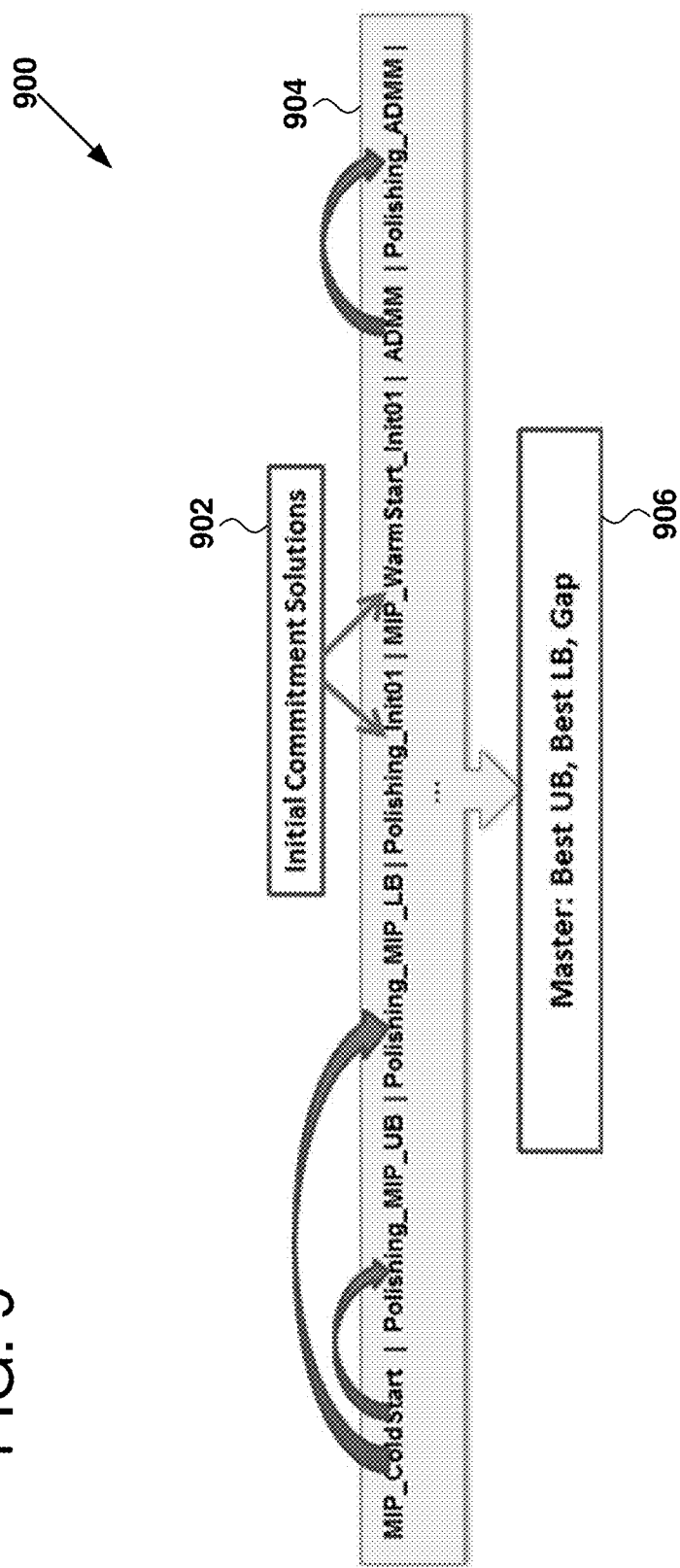
FIG. 9 is a diagram illustrating concurrent execution of nodes/threads carrying out different algorithms, as can be implemented in accordance with certain examples of the disclosed technology.

FIG. 9 depicts an exemplary diagram 900 of the interaction of various algorithms that can be incorporated in the disclosed software tool, including the enhanced polishing algorithm.

As shown, initial commitment solutions 902 are input to a process block 904, which includes a plurality of parallel threads and associated parameters. In particular, the initial solutions can be used as inputs to a thread carrying out a polishing algorithm (e.g., "Polishing_Init01") and to the full MIP solver (e.g., "MIP_WarmStart_Init01").

The solution from "MIP_ColdStart" can serve as an input to threads carrying out enhanced polishing algorithms. "Polishing_MIP_UB" can warm start from an upper bound solution from the MIP, whereas "Polishing_MIP_LB" can warm start from a lower bound solution from the MIP.

Further, process block 904 includes a thread carrying out an ADMM algorithm. Outputs (e.g., solutions) generated via the ADMM algorithm can serve as inputs to an enhanced polishing algorithm ("Polishing_ADMM"), as shown.

As shown at process block 906, outputs generated by process block 904 can include a best upper bound, a best lower bound, and a gap. These outputs can be provided to a master thread of the software tool, such as the concurrent optimizer. Further, these outputs can serve as inputs to subsequent solving iterations.

Accordingly, the disclosed enhanced polishing algorithm can start from (e.g., receive as an input) any initial solution from a SCED, including a SCED with binary variables relaxed. Generators with fractional binary solutions can all be added to the out-of-money generator set, so that the reduced MIP can solve them to binaries.

For example, historical commitment solutions (e.g., commitment solutions from the previous seven days) can be retrieved and used as initial solutions. Meanwhile, the intermediate upper bound binary solution and lower bound relaxation solution from the MIP solver can also retrieved through callback and sent to the enhanced polishing processors (e.g., the processor(s) executing the thread(s) carrying out the enhanced polishing algorithm). The intermediate solution from other algorithms such as ADMM can also be sent to the enhanced polishing processors. The best upper bound solutions can be sent to a master algorithm, which in turn can determine and report which of the upper bound solutions received from all solving processors is the best overall. In some examples, the enhanced polishing method is only used to provide an upper bound solution, and is not used to provide a lower bound solution.

The repaired initial commitment solution $u^0$ and lazy constraint $X_{Lazy0}$ can also be used to set MIP start and lazy constraints for a full MIP problem, and can provide both an upper bound and a lower bound to the master algorithm. By setting a large percentage of transmission constraints as lazy constraints, the time it takes to find the lower bound can also be reduced.

l. Case Study

A case study was performed utilizing the disclosed software tool to perform concurrent optimization using 18 nodes. Seven initial commitment solutions from production for the previous seven days were used. The 18 nodes included Node 1 acting as the master; Node 2 using Gurobi to solve a full MIP with default settings and cold start and send the intermediate upper bound solution to Node 3 and the intermediate lower bound solution to Node 4; Node 3 to run enhanced polishing from the upper bound solution retrieved from Node 2; Node 4 to run enhanced polishing from the lower bound solution retrieved from Node 2; respective Nodes 5-11 each running enhanced polishing from a corresponding one of the seven initial commitment solutions; and respective Nodes 12-18 each solving the full MIP with MIP start and lazy constraint settings from a corresponding one of the initial commitment solutions.

In the case study, the results of the enhanced polishing method were compared with the results of a Gurobi full MIP run performed on the same hardware using a single node. In particular, the Gurobi Solver was used to solve a full MIP long enough to get the lower bound close to the "true lower bound." Then, the upper bound solution from the enhanced polishing method and full MIP method to the true lower bound were compared. The results of the case study demonstrate that the enhanced polishing method can greatly reduce the time it takes to reach a high quality upper bound solution, especially in relatively hard cases. For example, for approximately the hardest 3% of the 110 cases studied, the enhanced polishing method achieved a solving time of approximately 500 seconds, whereas the full MIP method had a solving time of approximately 2000 seconds for these cases.

XIII. Software Tool Outputs

Returning to FIG. 2, software tool 200 can generate one or more outputs, e.g., based on the solutions generated by executing the threads carrying out algorithms 206. Outputs 212 can include contracts for market participants, prices, schedule data, and dispatch data. The schedule data can include, for each generator participating in the market, a schedule for the indicating whether the generator should be ON or OFF during each period. The dispatch data can include the amount of electricity the generator should supply during any ON periods, for example.

Figure 10:
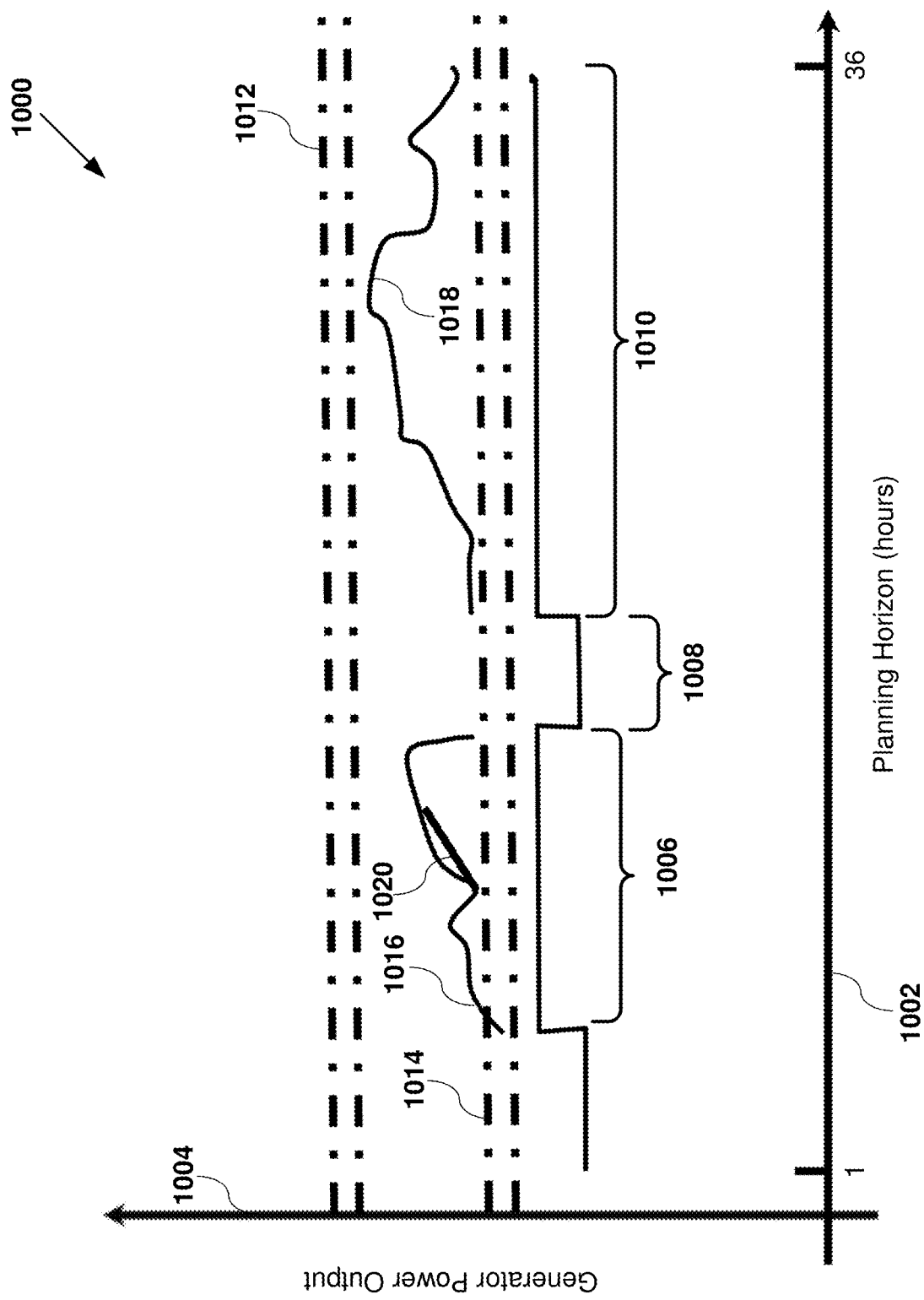
FIG. 10 is a graph of a generator schedule that can be determined based on outputs of a software tool, in accordance with certain examples of the disclosed technology.

FIG. 10 depicts an exemplary schedule 1000 for a generator that can be output by the disclosed software tool. While schedule 1000 is depicted in the form of a graph for illustrative purposes, the schedule can be communicated to the corresponding generator in another format without departing from the scope of this disclosure, e.g., as raw data. The x-axis 1002 depicts a planning horizon in hours, and the y-axis 1004 depicts generator output (e.g., the amount of electricity output by the generator). In the depicted example, the planning horizon is 36 hours long, and is divided into 36 hour-long periods of time. However, other planning horizon durations are contemplated.

Exemplary schedule 1000 includes a minimum up time 1006, corresponding to a minimum duration of generator operation; a minimum down time 1008, corresponding to a minimum duration of the generator being OFF (not operating); and a maximum up time 1010, corresponding to a maximum duration of generator operation. Optionally, schedule 1000 can also include a maximum number of generator starts, a maximum amount of dispatched energy, a reserve amount, etc. Dot dash lines 1012 represent a maximum amount of energy that can be generated by the generator, whereas dot dash lines 1014 represent a maximum amount of energy that can be generated by the generator.

In the depicted example, the schedule indicates that the generator should output electricity in amounts represented by characteristic 1016 and characteristic 1018 during corresponding portions of the planning horizon. The schedule also includes a ramp rate 1020, corresponding to a rate at which the power output of the generator is to "ramp up."

XIV. Example Experimental Results

Figure 11:
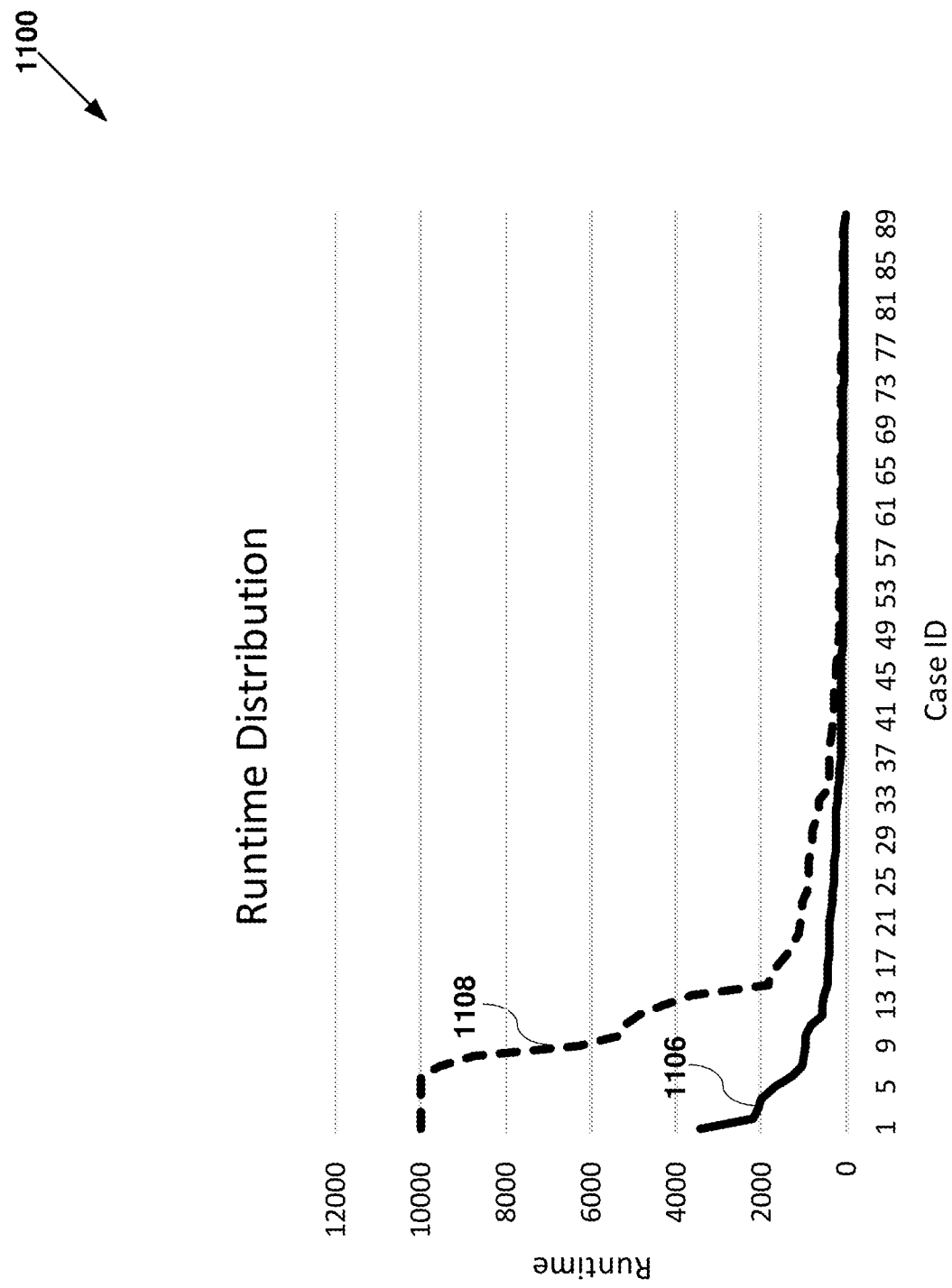
FIGS. 11-12 are graphs illustrating experimental results achieved by the disclosed software tool, in accordance with certain examples of the disclosed technology.
Figure 12:
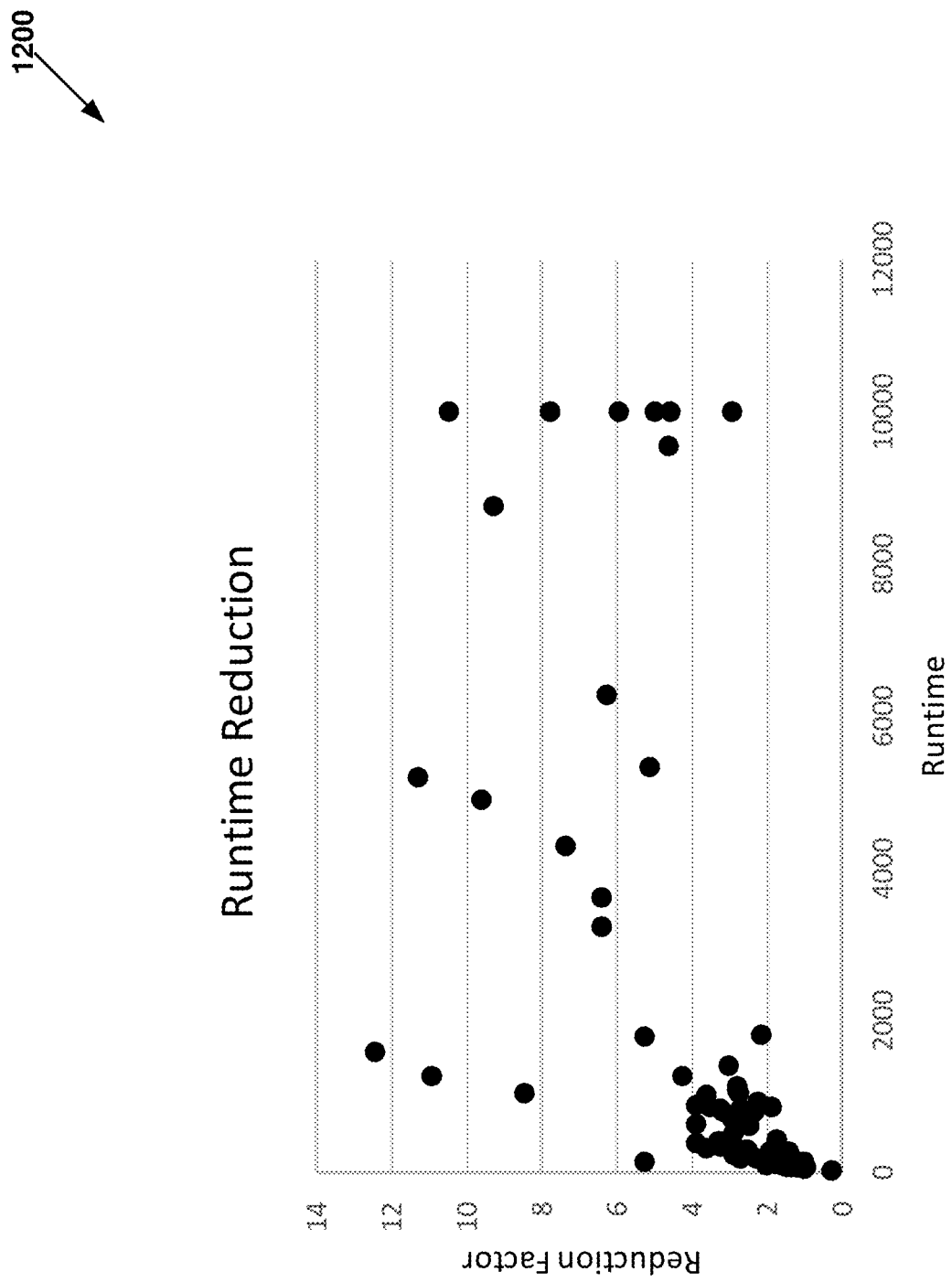

FIGS. 11 and 12 illustrate experimental results achieved by an example implementation of the disclosed software tool. In particular, FIG. 11 shows a graph 1100 illustrating the runtime distribution for a number of experimental cases. In graph 1100, characteristic 1106 represents the runtime (solving time) of the example implementation of the disclosed software tool for the experimental cases, whereas characteristic 1108 represents the runtime of an existing software tool implementing a full MIP method for the same experimental cases. As shown, an equivalent or faster (in some cases, considerably faster) solving time was achieved by the example implementation of the disclosed software tool relative to the existing software tool.

Relatedly, FIG. 12 shows a graph 1200 of the runtime reduction achieved by the example implementation of the disclosed software tool relative to the existing software tool. As shown, a significant reduction in runtime is achieved in many cases.

XV. Example Method of Optimizing SCUC Performance

Figure 13:
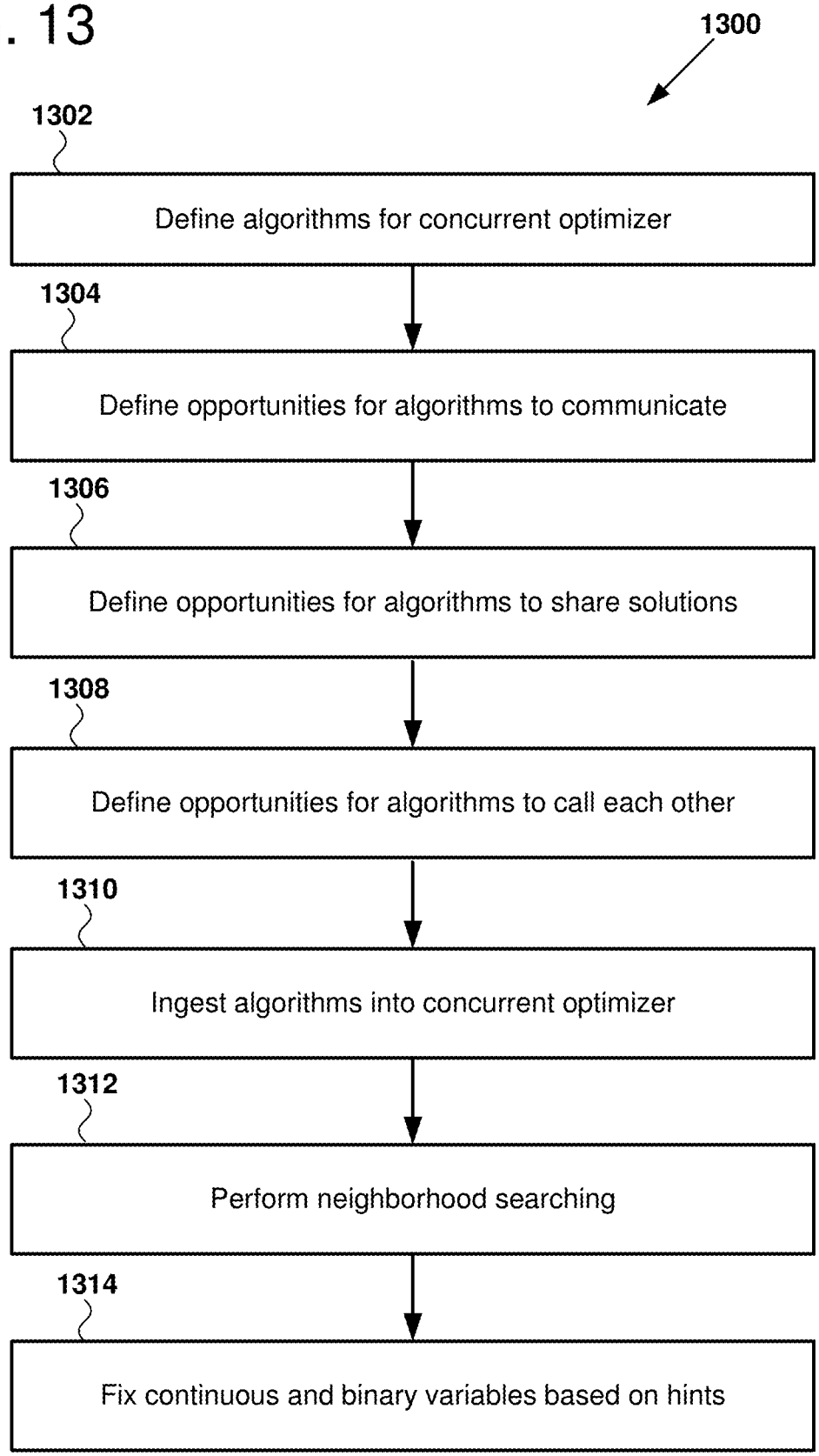
FIG. 13 illustrates an example method of optimizing SCUC performance, in accordance with certain examples of the disclosed technology.

FIG. 13 illustrates a method 1300 for optimizing SCUC performance according to at least one embodiment of the present disclosure. Method 1300 can be implemented by one or more computing nodes (e.g., computing nodes 114 of RTO/ISO 102 shown in FIG. 1).

At process block 1302, algorithms are defined for a concurrent solver. In a typical concurrent optimizer for MIP problems, the quickest algorithm to solve a problem is unknown until the solving process is performed. Accordingly, multiple algorithms are run simultaneously until one solution is found, stopping the solving process. In an optimized SCUC performance concurrent solver, any number of algorithms may be defined and used during the solving process. For example, as described above, B&B is one type of algorithm that may be used to solve an optimization problem. In B&B, a systematic enumeration of candidate solutions can be performed using state space search with branches formed for each subset of the solution set. By checking upper and lower bounds of the optimal solution, portions of the tree may be discarded if a more accurate solution cannot be found. One negative to using B&B is that its efficiency requires quality estimations of lower and upper bounds of branches in the search space; otherwise, extensive time may be wasted on branches that have no solution value. Without high-quality bounds, the tree could result in brute-force enumeration, which is extremely inefficient.

The traditional B&B algorithm can be improved in various ways for solving a SCUC problem. These improvements can include, for example, methods for separating the RINS subproblem from the B&B process as an independent process that may run on infrastructure parallel to B&B. Additionally, RINS can be formulated using specific characteristics unique to SCUC, such as incumbent solutions, historical optimal solutions, etc.

Another algorithm, ADMM, can also be used in SCUC problem solving. As described above, in ADMM, an optimization problem is broken down into smaller pieces, each of which is theoretically easier to handle than the convex optimization problem as a whole. ADMM may result in inefficiencies when applied as a solving algorithm for MIP in situations where the algorithm cannot determine the quality of the current solution. This may lead to local optimal solutions instead of global optimal solutions. The traditional ADDM algorithm may be improved in various ways when utilized for SCUC optimization. For example, autocorrelation may be used to break cycles that would lead to inefficient solving or local optimal solutions. Moreover, solving subsystems may be decomposed through a variety of variables such as resource types, resource characteristics, generation-load balance criteria, and spatial data. Other decomposition approaches may also be used in the concurrent solver, including, for example, Bender's decomposition, time interval decomposition, and Lagrangian Relaxation.

At process block 1304, efficiencies can be found by enabling algorithms defined at process block 1302 to communicate with each other. For example, during a concurrent solving cycle, if ADMM communicates data regarding upper and lower bounds to B&B, B&B could then provide optimizations by discarding unnecessary branches with this new data. Without this communication, B&B would be required to continue traversing unnecessary branches. In another example, if B&B communicates the current state of the solution to ADMM, ADMM could break down the remaining problem into smaller pieces, rather than breaking down the entire problem. In another example, ADMM could be used as a heuristics engine for B&B, in order to aid the development of optimization bounds. In yet another example, allowing RINS to communicate with other solutions in a concurrent solver may cause neighborhoods to form within B&B for additional fixing of variables.

At process block 1306, algorithms may share current solutions with each other. When using a concurrent solver for SCUC with ADMM as one of the algorithms being used, ADMM could suffer from converging to local optimal solutions or continue to cycle rather than converge on an optimal solution. If other algorithms within a concurrent solver communicate progress made in determining an optimal solution, ADMM could benefit by checking the quality of its current solution using data gleaned from the other algorithms. In another example, critical constraints unique to SCUC may be found by using solutions from algorithms currently being processed.

At process block 1308, multiple algorithms within a concurrent solver for SCUC may call each other as subroutines when another algorithm may be more efficient at solving a portion of a problem. For example, if a B&B algorithm is solving a branch, it may be more efficient to break down the branch into smaller problems through ADMM as a subroutine for heuristics rather than traverse the entirety of the branch using B&B. In another example, sending an ADMM intermediate solution as the incumbent solution, a partial solution, or a hint to other algorithms could lessen the complexity of the problem for those algorithms.

It should be appreciated that, at process block 1308, a new algorithm could be initiated during the solving process based on data or heuristics generated during the current process. The new algorithm may improve upon the initial solving state based on new data learned during solving of another algorithm. For example, if a new bound is determined in ADMM that would dramatically reduce the number of branches that need to be evaluated in B&B, a new B&B algorithm can be initiated with this improvement.

At process block 1310, the algorithms with improved functionality for inter-algorithm communication are entered into a concurrent solver. During solving, at process blocks 1312 and 1314, additional efficiencies may be found. The complexity in solving a SCUC problem can be attributed at least in part to the large number of binary and continuous variables that must be evaluated. When a variable is fixed, the problem becomes simpler. One advantage that a SCUC problem has over a traditional MIP problem is that historical optimal solutions may provide data that allows what is thought to be a binary or continuous variable to be fixed or an unlikely to bind constraint to be excluded or set as lazy.

As used herein, a lazy constraint is one that is assumed to be excluded until it becomes binding; an optimal solution cannot be found without including it in the analysis. By aggressively fixing variables and setting lazy constraints, a complex problem can be greatly simplified. For example, if a binary variable associated with whether a coal plant is turned on or off is part of a solution, algorithms must review both situations: on and off. However, if that coal plant has been in turned on for the last forty-six (46) weeks of optimal solutions, it can be fixed as being on, thereby simplifying the problem. Based on historical data for an ISO, many variables that could be binary or continuous can be assumed fixed.

Additionally, at process block 1314, heuristics may aid an algorithm in the solving process. Drawbacks of heuristics include the lack of a guarantee of the solution quality, and the chance that heuristics could trap an algorithm in local optimal rather than global optimal. In the past, MISO developed heuristic algorithms to identity generators that could be fixed at an initial existing commitment solution and unlikely to bind transmission constraints to be excluded. This resulted in fixing over eighty percent (80%) of the binary variables and excluding seventy percent to eighty percent (70%-80%) of the transmission constraints. However, if the initial commitment solution is not ideal, it may fix binary variables or exclude transmission constraints inappropriately and cause the solution to be trapped at a local optimal solution. It can also take long to converge with the large number of continuous variables remaining in the problem. Further development of the disclosed software tool has shown that by performing neighborhood searching to generate additional hints to a problem's solution, a large number of continuous variables and an improved set of binary variables may be fixed, and an accurate lazy constraint setting can be developed. Initial testing of an algorithm against a SCUC problem reveals that between seventy percent to ninety percent (70%-90%) of continuous variables may be fixed, greatly reducing the complexity of the problem. Additionally, with more continuous variables being fixed, additional binary variables and non-lazy transmission constraints may be included in the solver to avoid the problem of being trapped in a local optimal solution when using heuristics. This enhanced heuristic approach by generating hints to reduce a large SCUC problem to smaller problems with more robust convergence is referred to as the SCUC polishing algorithm. The approach can be further improved by using a large set of historical cases to generate initial commitment and hints. Techniques from machine learning can be applied to improve the quality of the hints on variable fixing and constraint lazy settings.

XVI. Another Example Method of Optimizing SCUC Performance

The enhanced polishing algorithm described herein can be combined with the modified ADMM algorithm to aid in determining which variables and constraints can be fixed in ADMM for a given SCUC problem or subproblem, which can in turn reduce the oscillation problem traditionally found in this solving algorithm. Of course, the enhanced polishing algorithm can also be fed with initial commitments generated by ADMM or other decomposition methods, and the solution from the enhanced polishing algorithm can also be used by other decomposition methods.

Figure 14:
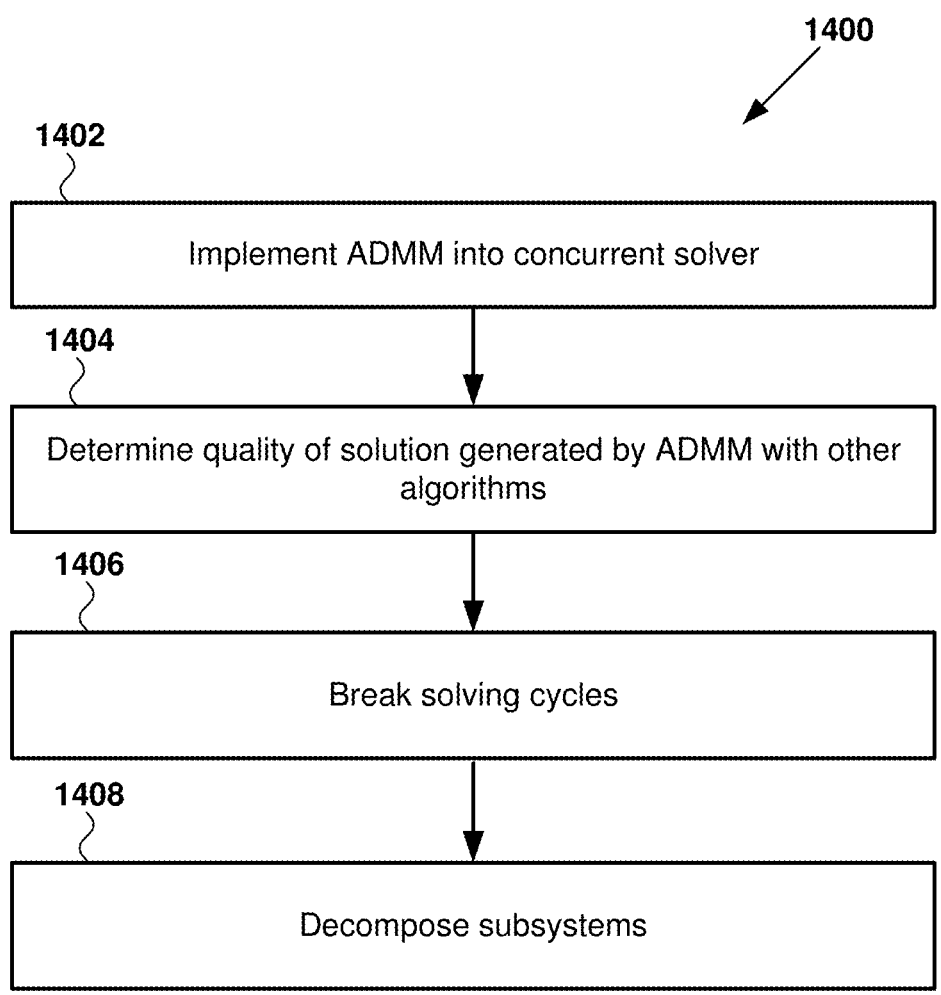
FIG. 14 illustrates another example method of optimizing SCUC performance, in accordance with certain examples of the disclosed technology.

FIG. 14 illustrates another example method 1400 for optimizing SCUC performance according to at least one embodiment of the present disclosure. In particular, the method 1400 can be used to improve SCUC performance by using a combination of the modified ADMM and enhanced polishing algorithms disclosed herein. Similar to method 1300, method 1400 can be implemented by one or more computing nodes (e.g., computing nodes 114 of RTO/ISO 102 shown in FIG. 1).

At process block 1402, an ADMM algorithm (e.g., the modified ADMM algorithm described herein) is implemented by a software tool. By implementing ADMM into a software tool such as the disclosed software tool, which concurrently solves multiple algorithms, SCUC problem solving can be performed more efficiently. For example, as the ADMM algorithm includes breaking down the subparts of a problem and finding localized partial solutions, this data can be communicated to other algorithms (e.g., other algorithms executing concurrently with the ADMM algorithms).

At process block 1404, other algorithms are used to determine the quality of a solution generated by the ADMM algorithm.

At process block 1406, breaking of solving cycles is performed. For example, this can include breaking solving cycles that are known to be inherently problematic in the context of ADMM. In one example, the breaking of solving cycles can be performed via autocorrelation. Accordingly, a traditional ADMM problem of solving cycles can be broken down in a SCUC problem by using autocorrelation.

At process block 1408, subsystems of the SCUC problem (e.g., subproblems) are decomposed. For example, subsystems can be developed for decomposition based on a variety of factors such as resource types, resource characteristics, generation-load balance criteria, and spatial data.

XVII. Example Method of Solving MIP Problems

Figure 15:
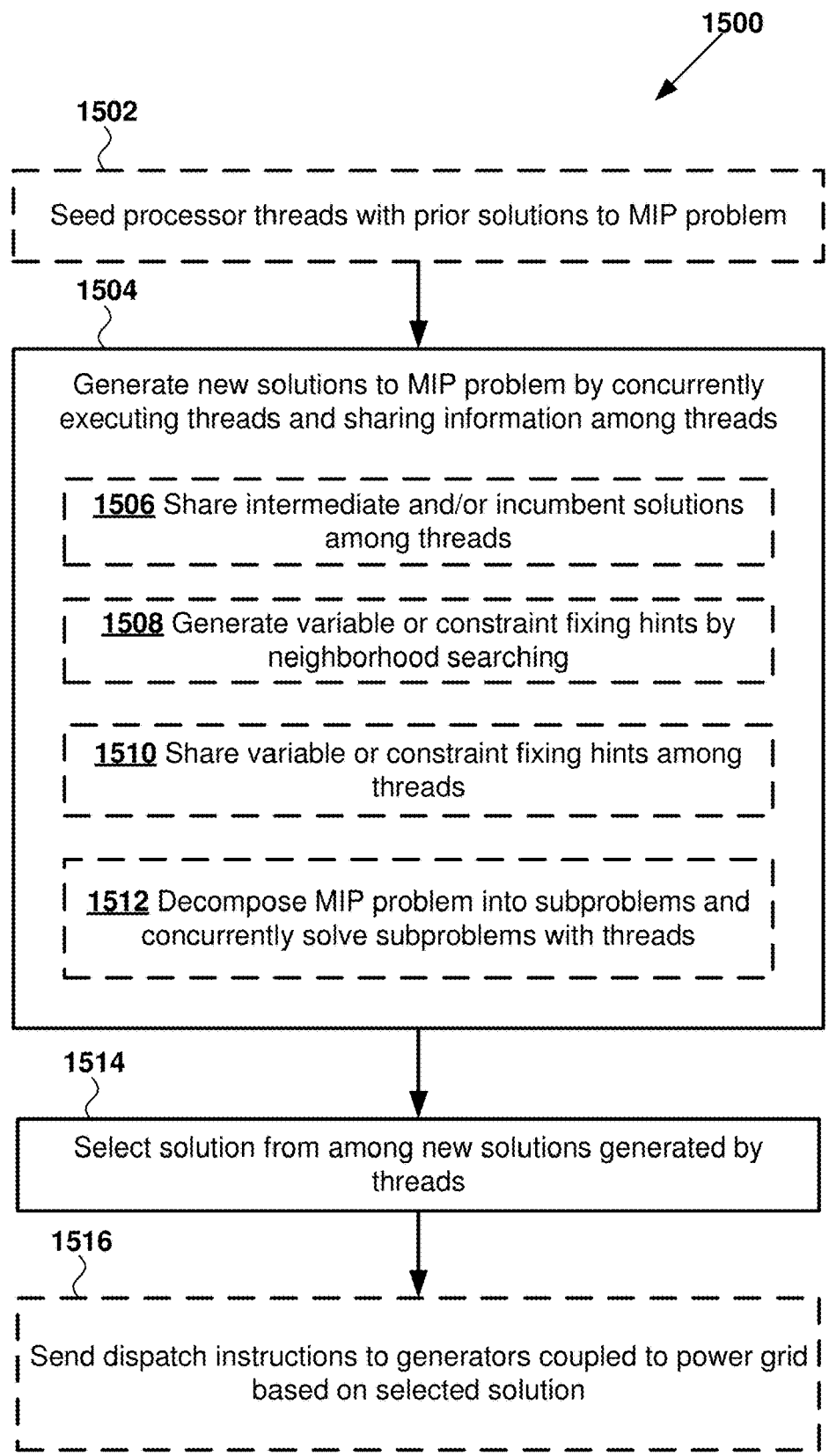
FIG. 15 illustrates an example method of solving a SCUC problem, in accordance with certain examples of the disclosed technology.

FIG. 15 illustrates a method 1500 for solving MIP problems (e.g., SCUC problems), according to at least one embodiment of the present disclosure. Similar to the methods described above, method 1500 can be implemented by one or more computing nodes (e.g., computing nodes 114 of RTO/ISO 102 shown in FIG. 1).

At optional process block 1502, a plurality of processor threads can be seeded with prior solutions to a MIP problem. As used herein, "seeding" an algorithm can include providing inputs to an algorithm for use during start (e.g., cold start) of the algorithm. The prior solutions can include historical solutions to the MIP problem, for example.

At process block 1504, new solutions to the MIP problem are generated by concurrently executing at least some of the threads and sharing data among the threads. This can optionally include sharing intermediate and/or incumbent solutions to the MIP problem among the threads, as indicated at optional sub-process block 1506; generating variable or constraint fixing hints by neighborhood searching, as indicated at optional sub-process block 1508; sharing variable or constraint fixing hints among the threads, as indicated at optional sub-process block 1510; and/or decomposing the MIP problem into subproblems and concurrently solving the subproblems with the threads, as indicated at optional sub-process block 1512.

At process block 1514, a solution is selected from among the new solutions generated by the threads. For example, a master thread of a computing node (e.g., a concurrent optimizer) can select the solution having the smallest gap between the lower bound and the upper bound.

At optional process block 1516, dispatch instructions are sent to generators coupled to the power grid based on the selected solution. For example, the dispatch instructions can include respective schedules for the generator, such as the schedule 1000 shown in FIG. 10.

XVIII. Example Method for a Compiler

Figure 16:
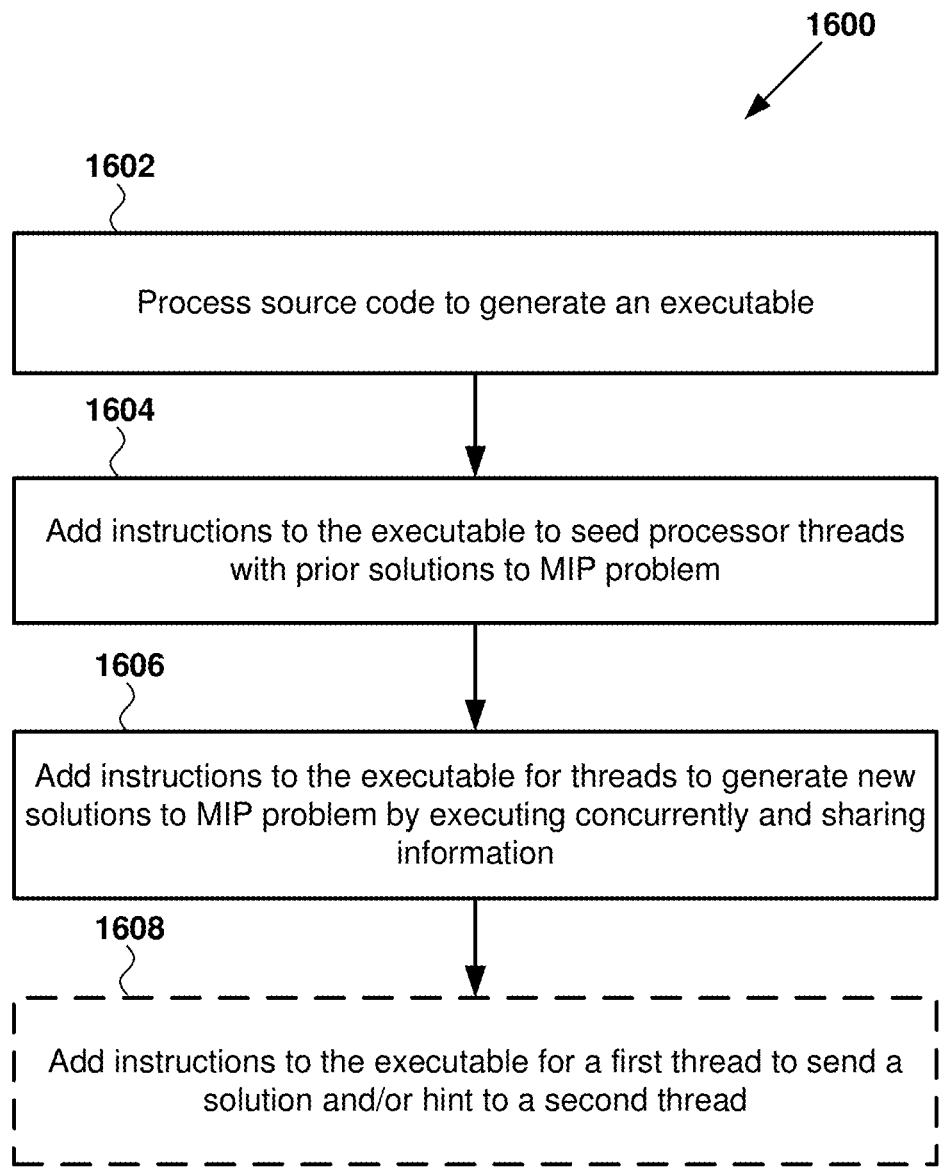
FIG. 16 illustrates an example method for a compiler, in accordance with certain examples of the disclosed technology.

FIG. 16 illustrates a method 1600 for a compiler, according to at least one embodiment of the present disclosure. Similar to the methods described above, method 1600 can be implemented by one or more computing nodes (e.g., computing nodes 114 of RTO/ISO 102 shown in FIG. 1).

At process block 1602, source code is processed to generate an executable. For example, a program written in any suitable computer programming language can be transformed to object code executable by one or more of the processors used to execute threads for solving the MIP problem.

At process block 1604, instructions are added to the executable to seed processor threads with prior solutions to a MIP problem (e.g., a SCUC problem). For example, the instructions can include computer-executable instructions to seed the threads with historical solutions to the MIP problem.

At process block 1606, computer-executable instructions are added to the executable for threads to generate new solutions to a MIP problem by executing concurrently and sharing data. This can include adding instructions to the executable that implement a concurrent optimizer, and/or adding instructions to the executable that enable communication among processor threads using a message passing protocol.

At optional process block 1608, computer-executable instructions can be added to the executable for a first thread to send a solution and/or hint to a second thread. Any of the disclosed computer-executable instructions can be stored in a computer readable storage device or memory.

Accordingly, a computer-implemented method can include processing, by a compiler, source code to generate an executable. The executable can include computer-executable instructions that cause a plurality of processor threads to be seeded with prior solutions to a mixed integer programming (MIP) problem, as well as computer-executable instructions that cause the threads to generate new solutions to the MIP problem by concurrently executing the threads and sharing data among the threads. The executable can further include computer-executable instructions that cause a first thread of the plurality of the threads to send a message to a second thread of the plurality of threads via a Message Passing Interface, the message including at least one of: an intermediate solution to the MIP problem generated by the first thread; an incumbent solution to the MIP problem generated by the first thread; or a hint for solving the MIP problem. The hint for solving the MIP problem can include at least one of: a hint identifying a value at which a binary or continuous variable of the MIP problem can be fixed; or a hint identifying a value at which a constraint of the MIP problem can be fixed.

XIX. Example Method of Solving MIP Problems

Figure 17:
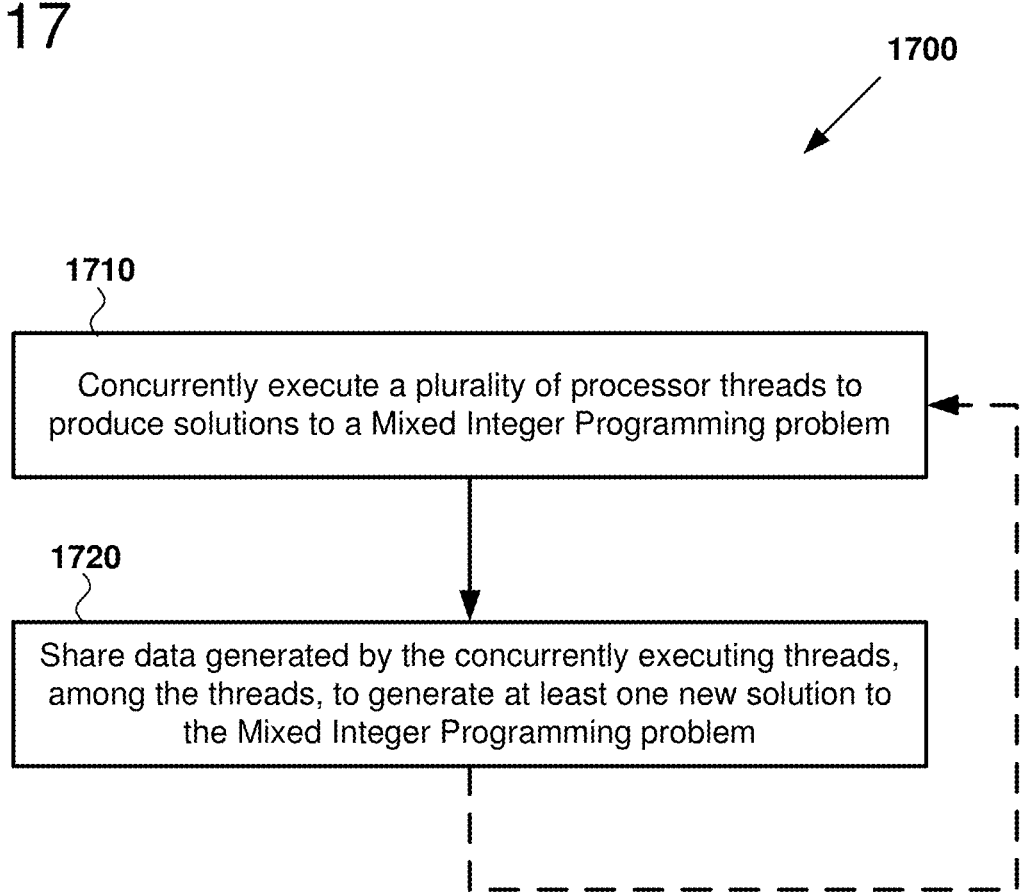
FIG. 17 illustrates an example method of sharing data while concurrently executing threads to solve a MIP problem, in accordance with certain examples of the disclosed technology.

FIG. 17 illustrates a method 1700 for solving MIP problems (e.g., SCUC problems), according to at least one embodiment of the present disclosure. Similar to the methods described above, method 1700 can be implemented by one or more computing nodes (e.g., computing nodes 114 of RTO/ISO 102 shown in FIG. 1).

At process block 1710, new solutions to a MIP problem are generated by concurrently executing a plurality of processor threads and sharing data among the threads. As the threads are concurrently executed, data among the threads can be shared, as discussed further below regarding process block 1720.

At process block 1720, data is shared among the threads. Such sharing can be performed by a number of different techniques, for example, such as by sharing intermediate and/or incumbent solutions to the MIP problem among the threads, sharing intermediate and/or incumbent solution among the threads, sharing variable or constraint fixing hints generated by neighborhood searching, sharing variable and/or constraint fixing hints among the threads, and/or decomposing the MIP problem into subproblems and concurrently solving the subproblems with the threads. Examples of suitable techniques for data sharing include but are not limited to, for example, message passing, such as using an MPI standard, file I/O, message passing via kernel buffers, mailbox message passing, pipe message passing, or using sockets. Threads/nodes implementing the disclosed method can communicate with one another, including while they are executing, to share solutions, hints, and other data. A concurrent optimizer can be used to facilitate such data sharing.

After at least some data is shared among the threads, the threads can resume concurrent execution as discussed above regarding process block 1710.

XX. Example Computing Environment

Figure 18:
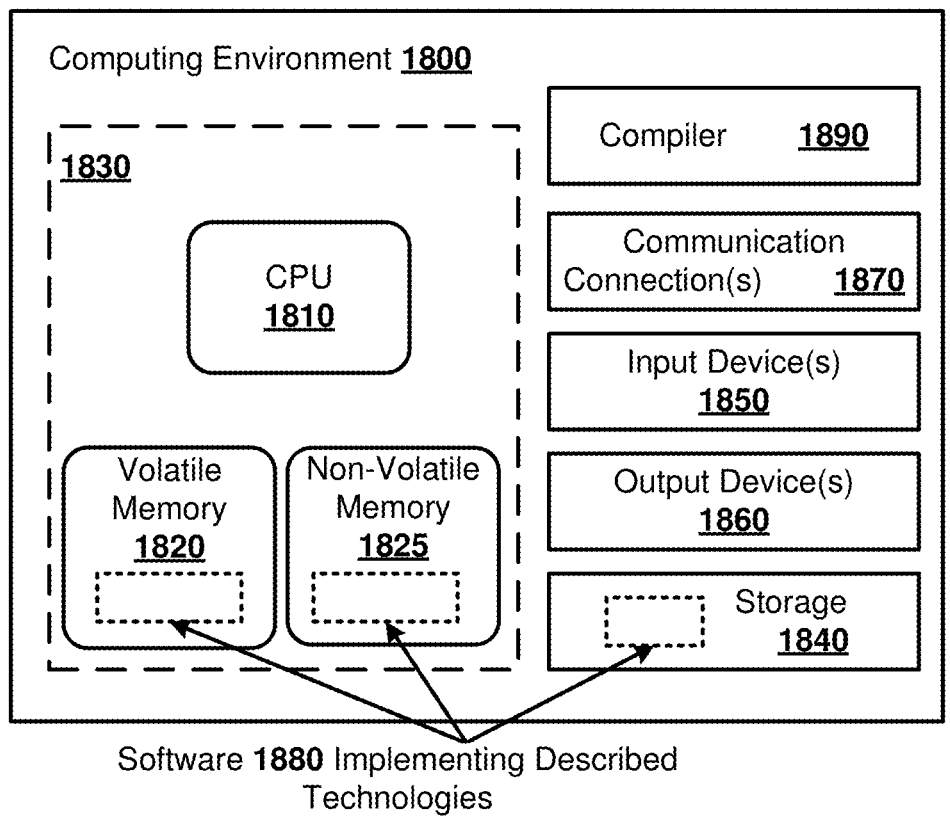
FIG. 18 is a diagram illustrating an example computing environment in which certain examples of the disclosed technology can be implemented.

FIG. 18 illustrates a generalized example of a suitable computing environment 1800 in which described embodiments, techniques, and technologies, including determining an energy response, generating and sending bids, and market coordination can be implemented. For example, the computing environment 1800 can be used to implement any of the controllers or AVRs, as described herein.

The computing environment 1800 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 18, the computing environment 1800 includes at least one central processing unit 1810, volatile memory 1820, and non-volatile memory. In FIG. 18, this most basic configuration 1830 is included within a dashed line. The central processing unit 1810 executes computer-executable instructions and may be a real or a virtual processor. The central processing unit 1810 can be a general-purpose microprocessor, a microcontroller, or other suitable processor. In a multi-processing system, multiple processing units execute computer-executable instructions to increase processing power and as such, multiple processors can be running simultaneously. The volatile memory 1820 can include registers, cache, static RAM (SRAM), dynamic RAM (DRAM, including embedded DRAM), or other suitable volatile storage devices, while non-volatile memory 1825 can include ROM, EPROM, EEPROM, flash memory, hard drives, or other suitable non-volatile storage devices. The memory 1820 and/or non-volatile memory store software 1880, parameters, and other data that can, for example, implement the technologies described herein. A computing environment may have additional features. For example, the computing environment 1800 includes storage 1840, one or more input devices 1850, one or more output devices 1860, and one or more communication connections 1870.

Computing environment 1800 can encompass computing nodes 114 shown in FIG. 1. Accordingly, similar to computing nodes 114, computing environment 1800 can be operated by an RTO/ISO, and can be coupled to a power grid and the components thereof.

As shown, computing environment 1800 can further include a compiler 1890. Compiler 1890 can be configured to receive source code and generate object code having computer-executable instructions to perform operations specified by the source code. In some examples, the compiler can be realized with software (e.g., software 1880).

An interconnection mechanism (not shown) such as a bus, a controller, or a network, interconnects the components of the computing environment 1800. Typically, operating system software (not shown) provides an operating environment for other software executing in the computing environment 1800, and coordinates activities of the components of the computing environment 1800.

The storage 1840 may be removable or non-removable, and includes magnetic disks, magnetic tapes or cassettes, CD-ROMs, CD-RWs, DVDs, or any other medium which can be used to store data and machine-executable instructions and that can be accessed within the computing environment 1800. The storage 1840 stores instructions for the software 1880, which can be used to implement technologies described herein.

The input device(s) 1850 may be a touch input device, such as a keyboard, keypad, mouse, touch screen display, pen, or trackball, a voice input device, a scanning device, or another device, that provides input to the computing environment 1800. For audio, the input device(s) 1850 may be a sound card or similar device that accepts audio input in analog or digital form, or a CD-ROM reader that provides audio samples to the computing environment 1800. The input device(s) 1850 can also include sensors and other suitable transducers for generating data about power generators or other power grid components, for example, voltage measurements, frequency measurements, current measurements, temperature, and other suitable sensor data. The output device(s) 1860 may be a display, printer, speaker, CD-writer, or another device that provides output from the computing environment 1800. The output device(s) 1860 can also include interface circuitry for sending commands and signals to the components of power grid components such as generators. This can include interface circuitry for sending dispatch instructions to generators or other devices coupled to the power grid.

The communication connection(s) 1870 enable communication over a communication medium (e.g., a connecting network) to another computing entity. The communication medium conveys information such as computer-executable instructions, compressed graphics information, video, or other data in an adjusted data signal. The communication connection(s) 1870 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed controllers and coordinators. Both wired and wireless connections can be implemented using a network adapter. In a virtual host environment, the communication(s) connections can be a virtualized network connection provided by the virtual host. In some examples, the communication connection(s) 1870 are used to supplement, or in lieu of, the input device(s) 1850 and/or output device(s) 1860 in order to communicate with the generators, sensors, other controllers and AVRs, or other power grid components.

Computer-readable media are any available media that can be accessed within a computing environment 1800. By way of example, and not limitation, with the computing environment 1800, computer-readable media include memory 1820 and/or storage 1840. As should be readily understood, the term computer-readable storage media includes the media for data storage such as memory 1820 and storage 1840, and not transmission media such as adjusted data signals.

In view of the many possible embodiments to which the principles of the disclosed subject matter may be applied, it should be recognized that the illustrated examples are only preferred examples and should not be taken as limiting the scope of the claims. Rather, the scope of the claimed subject matter is defined by the following claims. We therefore claim as our invention all that comes within the scope of these claims.

What is claimed is:

1. A method, comprising:
with a plurality of processors:
decomposing a Mixed Integer Programming (MIP) problem, the MIP problem being a Security Constrained Unit Commitment (SCUC) problem for an upcoming planning horizon of a power grid, into a plurality of subproblems; and
generating new solutions to the SCUC problem by concurrently executing a plurality of processor threads comprising at least a first thread and a second thread and sharing data generated by the concurrently executing among the threads, including having the first thread call the second thread as a subroutine to solve one of the subproblems.

2. The method of claim 1, wherein the method further comprises seeding one or more of the threads with at least one previously generated solution to the SCUC problem from a prior planning horizon of the power grid.

3. The method of claim 2, further comprising:
selecting a solution from among the solutions generated by the threads for the upcoming planning horizon;
determining respective dispatch instructions for one or more generators of the power grid based on the selected solution; and
communicating the respective dispatch instructions to the one or more generators.

4. The method of claim 2, wherein the data shared among the threads comprises at least one of: an intermediate solution to the SCUC problem; or an incumbent solution to the SCUC problem.

5. The method of claim 4, wherein sharing data among the threads comprises sending a message from the first thread to the second thread using a Message Passing Interface.

6. The method of claim 1, wherein:
each of the respective processors executes at least one process, and each process comprises at least one of the plurality of processor threads; and
the SCUC problem comprises a plurality of variables and a plurality of constraints.

7. The method of claim 6, wherein the variables comprise binary variables and continuous variables, wherein the binary variables comprise a variable representing an ON/OFF state of a generator coupled to the power grid, and wherein the continuous variables represent one or more of: a quantity of power to be produced by the generator, power consumption of dispatchable demands, power supply for virtual bids, power consumption for virtual bids, power reserve decisions, or auxiliary variables for modeling.

8. The method of claim 6, wherein the constraints comprise at least one of: power balance constraints, transmission constraints, reserve constraints, or resource constraints.

9. One or more computing devices comprising:
memory; and
a plurality of processors, each of the respective processors being configured to execute machine-readable instructions stored in the memory that cause the computing devices to perform operations for solving a Security Constrained Unit Commitment (SCUC) problem for an upcoming planning horizon of a power grid, the operations comprising:
seeding a plurality of threads with prior solutions to the SCUC problem, the plurality of threads comprising at least a first thread and a second thread associated with different classes of algorithms,
decomposing the SCUC problem into a plurality of subproblems, and
generating new solutions to the SCUC problem by concurrently executing the threads and sharing data generated by the concurrently executing among the threads, including having the first thread call the second thread as a subroutine to solve one of the subproblems.

10. The one or more computing devices of claim 9, wherein the data shared among the threads comprises at least one of: an intermediate solution to the SCUC problem; an incumbent solution to the SCUC problem; or a hint for solving the SCUC problem.

11. The one or more computing devices of claim 9, wherein the algorithms comprise at least one of: an Alternating Direction Method of Multipliers (ADMM) algorithm; a Branch-and-Bound (B&B) algorithm; a Relaxation Induced Neighborhood Search algorithm; and an enhanced polishing algorithm.

12. A method, comprising:
with a compiler executing on a processor, transforming source code to solve a mixed integer programming (MIP) problem into machine-executable code, the machine-executable code comprising:
computer-executable code that when executed by a processor causes a plurality of processor threads to be seeded with prior solutions to the MIP problem, the threads comprising at least a first thread and a second thread;
computer-executable code that when executed by a processor causes the MIP problem to be decomposed into a plurality of subproblems; and
computer-executable code that when executed by a processor causes the threads to generate improved solutions to the MIP problem by concurrently executing the threads and sharing data between the threads, including code that when executed by a processor causes the first thread to call the second thread as a subroutine to solve one of the subproblems; and
storing the machine-executable code in a computer-readable storage device or memory.

13. The method of claim 12, wherein the machine-executable code further comprises computer-executable code that when executed by a processor causes the first thread to send a message to the second thread via a Message Passing Interface, the message including at least one of: an intermediate solution to the MIP problem generated by the first thread; or an incumbent solution to the MIP problem generated by the first thread.

14. The method of claim 12, wherein the first thread and the second thread are associated with different classes of algorithms.

15. One or more computing devices comprising:
  memory; and
  a plurality of processors, each of the respective processors being configured to execute machine-readable instructions stored in the memory that cause the computing devices to perform operations for solving a Security Constrained Unit Commitment (SCUC) problem for an upcoming planning horizon of a power grid, the operations comprising:
  seeding a plurality of threads with prior solutions to the SCUC problem, the plurality of threads comprising at least a first thread and a second thread associated with different classes of algorithms,
  decomposing the SCUC problem into a plurality of subproblems; and
  generating new solutions to the SCUC problem by concurrently executing the threads and sharing data generated by the concurrently executing among the threads, including having the first thread call the second thread as a subroutine to solve one of the subproblems.

* * * * *